US012645123B2

(12) United States Patent
Ray et al.

(10) Patent No.: US 12,645,123 B2
(45) Date of Patent: Jun. 2, 2026

(54) DESIGNING OPTICAL AND ELECTRICAL PROPERTIES OF ELECTROCHROMIC DEVICES VIA TUNING OF PARAMETERS

(71) Applicant: SAGE Electrochromics, Inc., Faribault, MN (US)

(72) Inventors: Hannah Leung Ray, Minneapolis, MN (US); Wen Li, Lakeville, MN (US); Theo Chevallier, Paris (FR); Frank McGrogan, Faribault, MN (US); Yigang Wang, Maple Grove, MN (US); Chloe Bouard, Vincennes (FR); Amaury Patissier, Paris (FR); Elsa Perrin, Paris (FR); Shefali Panse, Northfield, MN (US); Marie-Caroline Solignac, Paris (FR)

(73) Assignee: SAGE Electrochromics, Inc., Faribault, MN (US)

( * ) Notice: Subject to any disclaimer, the term of this patent is extended or adjusted under 35 U.S.C. 154(b) by 621 days.

(21) Appl. No.: 18/051,852

(22) Filed: Nov. 1, 2022

(65) Prior Publication Data

US 2023/0168559 A1 Jun. 1, 2023

Related U.S. Application Data

(60) Provisional application No. 63/274,906, filed on Nov. 2, 2021.

(51) Int. Cl.
*G02F 1/163* (2006.01)
*G02F 1/1514* (2019.01)
*G02F 1/155* (2006.01)

(52) U.S. Cl.
CPC ............ *G02F 1/163* (2013.01); *G02F 1/1514* (2019.01); *G02F 1/155* (2013.01); *G02F 2001/1555* (2013.01)

(58) Field of Classification Search
CPC ......... G09G 3/19; G02F 1/163; G02F 1/1514; G02F 1/155; G02F 1/15; G02F 1/1524; G02F 2001/1555
See application file for complete search history.

(56) References Cited

U.S. PATENT DOCUMENTS

| | | |
|---|---|---|
| 4,938,571 A | 7/1990 | Cogan et al. |
| 5,668,663 A | 9/1997 | Varaprasad et al. |
| | (Continued) | |

FOREIGN PATENT DOCUMENTS

| | | |
|---|---|---|
| CA | 1265603 A | 2/1990 |
| CA | 2580541 A1 | 10/1998 |
| | (Continued) | |

OTHER PUBLICATIONS

International Search Report and Written Opinion mailed Mar. 9, 2023 in PCT/US2022/079141, SAGE Electrochromics, Inc, pp. 1-10.

(Continued)

*Primary Examiner* — Angela M. Medich
(74) *Attorney, Agent, or Firm* — Robert C. Kowert; Kowert, Hood, Munyon, Rankin & Goetzel, P.C.

(57) ABSTRACT

Various embodiments disclosed herein relate to techniques for simultaneously designing optical and electrical properties of an electrochromic device by tuning specific parameters of the electrochromic device. One or more models representing respective relationships of the optical and electrical properties with respect to the individual ones of the parameters of the device may be obtained. Given specific values of the optical and/or electrical properties, at least one of the parameters may be adjusted to simultaneously control the optical and electrical properties according to the given specific values.

19 Claims, 17 Drawing Sheets

(56) References Cited

U.S. PATENT DOCUMENTS

| | | | |
|---|---|---|---|
| 5,985,486 | A | 11/1999 | Giron |
| 7,277,215 | B2 * | 10/2007 | Greer .................... G02F 1/163 |
| | | | 359/900 |
| 8,764,950 | B2 | 7/2014 | Wang et al. |
| 10,185,197 | B2 | 1/2019 | Pradhan et al. |
| 11,187,954 | B2 | 11/2021 | Rozbicki |
| 2002/0067905 | A1 | 6/2002 | MacPherson et al. |
| 2003/0227664 | A1 | 12/2003 | Agrawal |
| 2004/0233537 | A1 | 11/2004 | Agrawal |
| 2006/0028730 | A1 | 2/2006 | Varaprasad et al. |
| 2007/0285759 | A1 | 12/2007 | Ash et al. |
| 2012/0206789 | A1 | 8/2012 | Chang et al. |
| 2016/0011480 | A1 | 1/2016 | Pradhan et al. |
| 2017/0059957 | A1 | 3/2017 | Garcia et al. |
| 2017/0131611 | A1 * | 5/2017 | Brown .................... G02F 1/163 |
| 2018/0252979 | A1 * | 9/2018 | Park ........................ G02F 1/163 |
| 2018/0307110 | A1 | 10/2018 | Nguyen et al. |
| 2019/0077676 | A1 | 3/2019 | Nakayama |
| 2019/0302561 | A1 | 10/2019 | Rozbicki et al. |
| 2020/0301234 | A1 | 9/2020 | McNeil et al. |
| 2021/0109417 | A1 | 4/2021 | Liebl et al. |
| 2021/0271145 | A1 | 9/2021 | Li et al. |
| 2023/0077782 | A1 | 3/2023 | Li |
| 2023/0132451 | A1 * | 5/2023 | Makker .................... G06F 3/16 |
| | | | 704/275 |

FOREIGN PATENT DOCUMENTS

| | | | |
|---|---|---|---|
| CN | 1479152 | A | 3/2004 |
| CN | 103864314 | A | 6/2014 |
| CN | 106033166 | A | 10/2016 |
| CN | 107098596 | A | 8/2017 |
| CN | 110596981 | A | 12/2019 |
| KR | 19980702311 | A | 7/1998 |
| KR | 20170087931 | A | 7/2017 |
| TW | 201621438 | A | 6/2016 |
| TW | I644153 | B | 12/2018 |
| WO | 9722906 | A1 | 6/1997 |
| WO | 2016085823 | A1 | 6/2016 |
| WO | 2016086017 | A1 | 6/2016 |
| WO | 2017034847 | A1 | 3/2017 |
| WO | 2019050530 | A1 | 3/2019 |
| WO | 2020018002 | A1 | 1/2020 |

OTHER PUBLICATIONS

Bouvard, et al., "In Situ Photoelectron spectroscopy: A Powerful Tool To Develop Electrochromic Materials," CISBAT 2015, Sep. 9-11, 2015, pp. 33-38.

E. Washizu, et al., "Optical and electrochromic properties of RF reactively sputtered WO3 films", Solid State Ionics, 2003, pp. 175-180, 165 no. 1-4, Elsevier.

SageGlass, "What is Electrchromic Glass", [online] Jan. 25, 2018, pp. 1-4, Retrieved from the Internet: https://www.sageglass.com/en/article/what-electrochromic-glass [retrieved on Sep. 30, 2020.

Paladno and Company, "Performance Assessment of SageGlass © Electrochromic Coatings and Control Scenarios", presentation SageGlass Energy Performance Modeling, Jun. 2010, pp. 1-10, appendices i-xiii.

M. A. Arvizu, et al., "Electrochromism in sputter deposited W1-yMoyO3 thin films", INERA Conference 2015: Light in Nanoscience and Nanotechnology (LNN 2015), Journal of Physics: Conference Series 682 (2016), pp. 1-6.

Suvarna R. Bathe et al., "Influence of Nb doping on the electrochromic properties of WO3 films", Journal of Physics D: Applied Physics, 2007, pp. 7423-7431.

Shankara S. Kalanur, et al., "Influence of molybdenum doping on the structural, optical and electronic properties of WO3 for improved solar water splitting", Journal of Colloid and Interface Science 509, 2018, pp. 440-447.

K. Muthu Karuppasamy, et al., "Results on the electrochromic and photocatalytic properties of vanadium doped tungsten oxide thin films prepared by reactive dc magnetron sputtering technique", Journal of Physics D: Applied Physics 41, 2008, pp. 2-6.

A. Pennisi, et al., "Electrochromic properties on tungsten-molybdenum oxide electrodes", Solar Energy Materials and Solar Cells 28, 1992, pp. 233-247.

A. Rougier, et al., "Electrochromism of Mixed Tungsten-Vanadium Oxide Thin Films Grown by Pulsed Laser Deposition", Journal of the Electrochemical Society, 148, 2001, pp. H7-H12.

A. Rougier, et al., "Electrochromic W—M—O (M=V, Nb) sol-gel thin films: a way to neutral colour", Solar Energy Materials & Solar Cells 71, 2002, pp. 343-357.

Extended European Search Report mailed Aug. 25, 2025 in European Patent Application No. 22891005.5, Sage Electrochromics, Inc., 7 pages.

Wang J., et al., "The kinetic behaviour of ion transport in WO3 based films produced by sputter and sol-gel deposition: Part I. The simulation model", Solar Energy Materials & Solar Cells, Oct. 1, 1999, pp. 167-183, vol. 59, No. 3, Elsevier Science Publishers, Amsterdam, NL.

Appiah, Williams Agyei, et al., "Effect of electrolyte concentration on electrochromic performance of sputtered tungsten oxide film: Experiments and simulation", Electrochimica Acta, Dec. 30, 2020, vol. 369, Elsevier, Amsterdam, NL.

Macrelli, G., et al, "Optical measurements and modeling of an all solid state inorganic thin film electrochromic system", Journal of Non-Crystalline Solids, Sep. 1, 1997, pp. 296-301, vol. 218 North-Holland Physics Publishing. Amsterdam, NL.

Wikipedia webpage, "Doping (semiconductors)" as of Dec. 27, 2008, retrieved from https://en.wikipedia.org/w/index.php?title=Doping_(semiconductor)&oldid=260317582 on Mar. 9, 2022.

Wikipedia webpage, "Non-stoichiometric compound" as of Oct. 10, 2008, retrieved from https://en.wikipedia.org/w/index.php?title=Non-stoichiometric_ compound&oldid=244411031 Mar. 10, 2022.

Shah Zeb et al., "Advanced developments in nonstoichiometric tungsten oxides for electrochromic applications," Mater. Adv. 2021, 2, pp. 6839-6884.

Fabretto et al: "Colouration efficiency measurements in electrochromic polymers: The importance of charge density", Electrochemistry Communications, vol. 9, No. 8, Aug. 1, 2007, pp. 2032-2036, Elsevier Amsterdam, NL, ISSN: 1388-2481, DOI: 10.1016/J. ELECOM.2007.05.035.

* cited by examiner

*Evolution of the level of clear state with regards to the total mobile Li quantity*

*CE capacity*

*Lithium cathode power*

*TL clear state (%)*

*Evolution of the level of tinted state with regards to the total mobile Li quantity*

EC capacity

Lithium cathode power

TL tinted state (%)

Evolution of the colors in transition in a clear state with regards to the total mobile Li quantity Evolution of the colors in transition in a tinted state with regards to the total mobile Li quantity

*Evolution of the contrast with regards to the EC thickness*

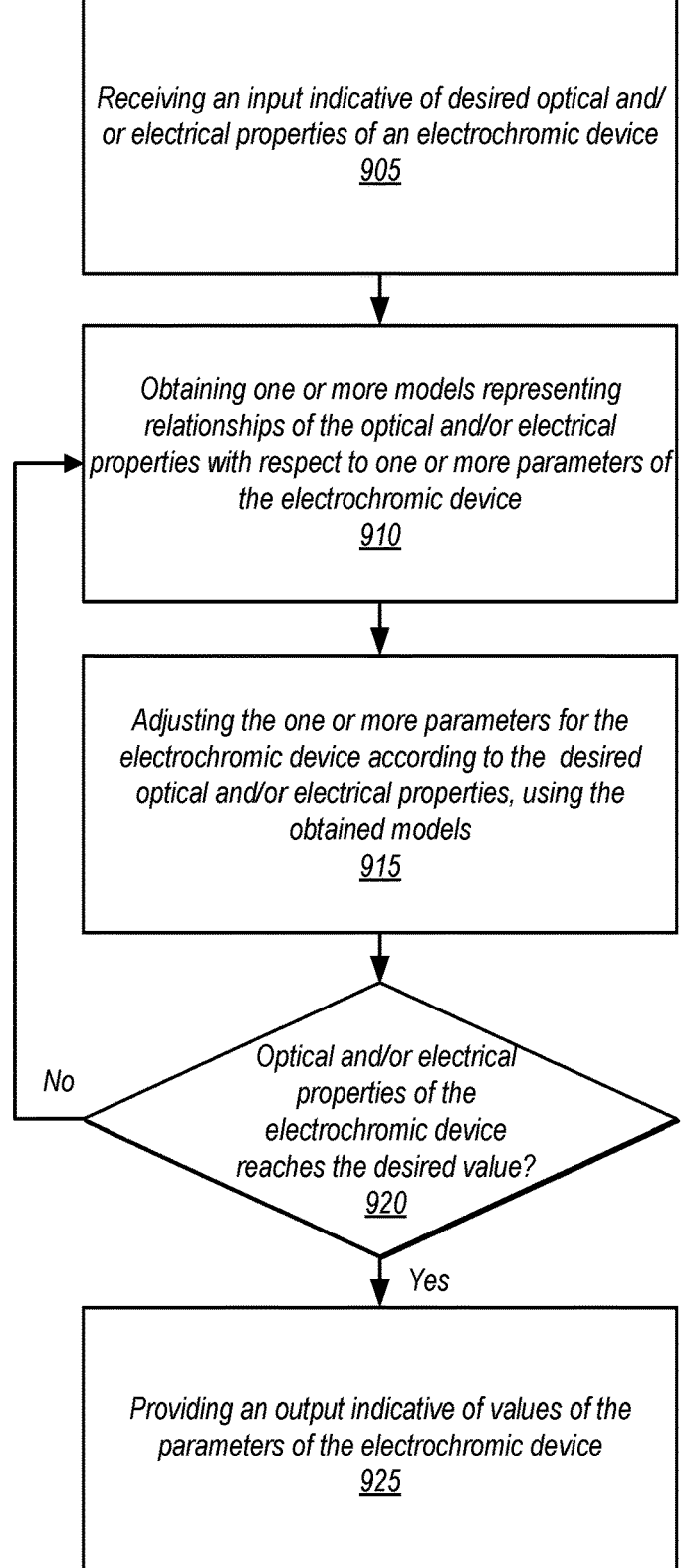

*Receiving an input indicative of desired optical and/or electrical properties of an electrochromic device*
905

*Obtaining one or more models representing relationships of the optical and/or electrical properties with respect to one or more parameters of the electrochromic device*
910

*Adjusting the one or more parameters for the electrochromic device according to the desired optical and/or electrical properties, using the obtained models*
915

*Optical and/or electrical properties of the electrochromic device reaches the desired value?*
920

No

Yes

*Providing an output indicative of values of the parameters of the electrochromic device*
925

*FIG. 9*

DESIGNING OPTICAL AND ELECTRICAL PROPERTIES OF ELECTROCHROMIC DEVICES VIA TUNING OF PARAMETERS

PRIORITY CLAIM

This application claims benefit of priority to U.S. Provisional Application Ser. No. 63/274,906, entitled "Designing Optical and Electrical Properties of Electrochromic Devices via Tuning of Parameters," filed Nov. 2, 2021, and which is hereby incorporated herein by reference in its entirety.

BACKGROUND

Electrochromic devices include electrochromic materials which change their optical properties in response to application of an electrical current or an electrical voltage. Therefore, by controlling the current or voltage, the optical transmission, absorption, reflectance, and/or emittance of the electrochromic devices can be regulated. Given the above optical and electrical properties, electrochromic devices can be used to build smart glasses or reflective mirrors. Traditionally, when designing an electrochromic device, the selection or design of optical and electrical properties of the electrochromic device are performed separately. Generally, design of the optical properties is finished first. After the optical properties become finalized, design of the electrical properties of the electrochromic device gets started. This can create a control challenge because the electrical properties, which in turn controls the optical performance of the electrochromic device in use, is hard to be adjusted or evolve over time. Therefore, it is desirable to have a more optimal approach for designing electrochromic devices.

BRIEF DESCRIPTION OF THE DRAWINGS

FIG. 9 shows a high-level flowchart illustrating a method for simultaneously designing the optical and electrical properties of an electrochromic device by adjusting one or more parameters, according to some embodiments.

Figure 1:
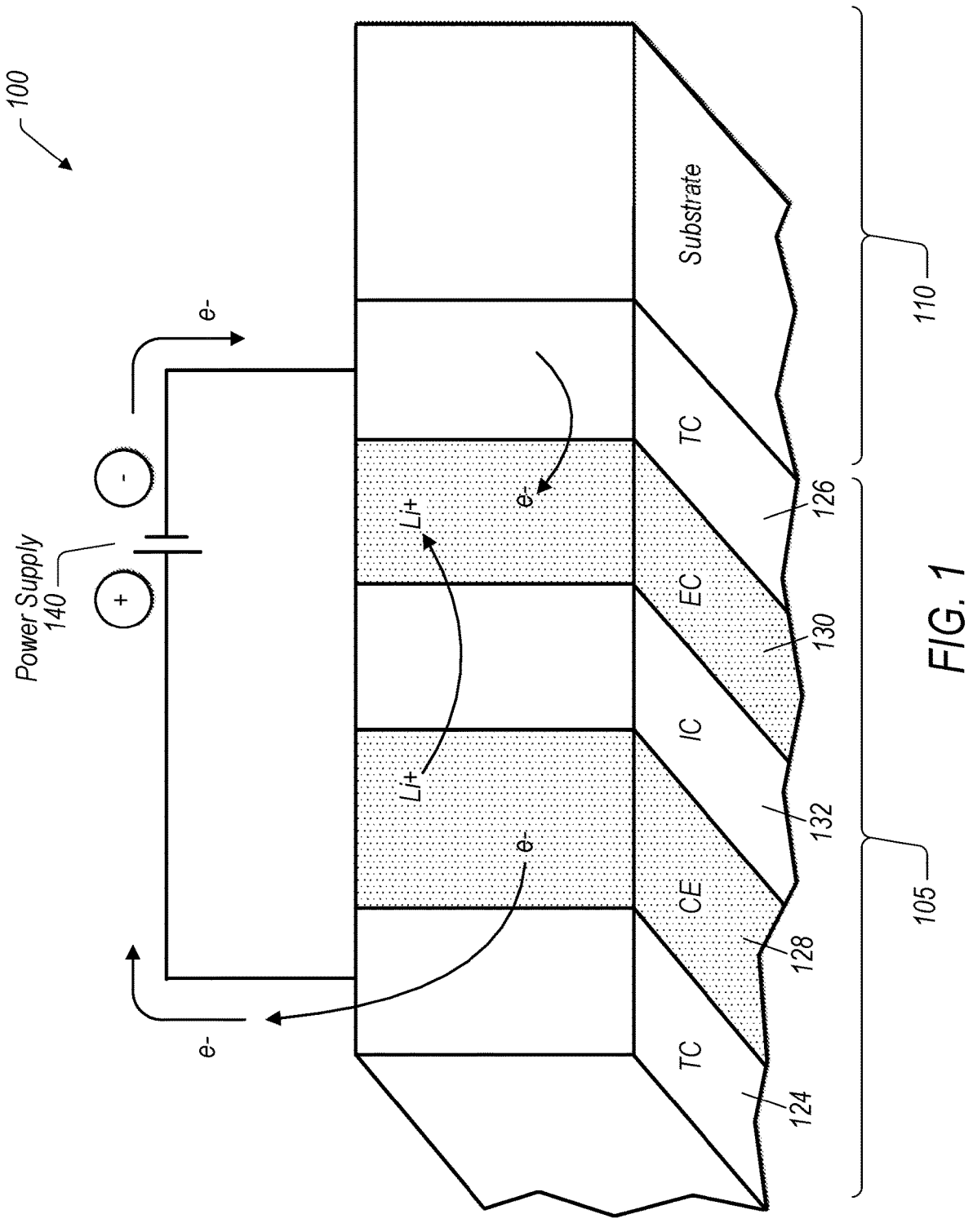
FIG. 1 shows an example electrochromic system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments disclosed herein relate to techniques for simultaneously designing optical and electrical properties of an electrochromic device by tuning specific parameters of the electrochromic device. In some embodiments, individual ones of the parameters may affect both the optical and electrical properties of the electrochromic device. Therefore, by adjusting one or more of the specific parameters, the optical and electrical properties of the electrochromic device may be controlled simultaneously, tradeoff between various properties may be made, and the performance of the electrochromic device may be optimized. In some embodiments, the parameters may include the deposition temperature, thickness of the counter-electrode (CE) layer, thickness of the electrochromic electrode (EC) layer, ratio of the thickness between CE and EC layers, and amount of lithium doping within the electrochromic device. In some embodiments, designing the electrochromic device may include identifying one or more models representing respective relationships of the optical and electrical properties with respect to individual ones of the parameters of an electrochromic device. In some embodiments, given specified values of optical and electrical properties, one or more of the parameters may be controlled to simultaneously adjust the optical and electrical properties of the electrochromic device according to the given values.

In some embodiments, the electrochromic device may include a series of thin films deposited onto the surface of a transparent substrate, such as a window or mirror made of glass or plastic. In some embodiments, the electrochromic device may be coupled with a control module (e.g., housed in a control panel) which may be further coupled with a power source (e.g., an electrical outlet or battery). In some embodiments, the control module may receive feedback signal(s) from sensor attached to the electrochromic device and control signal(s) which indicates a level of visible light transmission % T (or tint level). In some embodiments, given the optical and electrical properties of the electrochromic device which have been designed, the control module may regulate the output current or voltage applied to the electrochromic device based on the feedback and control signals to control the transparency of the electrochromic device.

FIG. 1 shows an example electrochromic system, according to some embodiments. In this example, electrochromic system 100 may include electrochromic device 105 secured to substrate 110. For instance, electrochromic device 105 may include a thin film which may be deposited on to substrate 110. Electrochromic device 105 may include includes a first transparent conductor (TC) layer 124 and the second TC layer 126 in contact with substrate 110. Substrate 110 may include one or more optically transparent materials, e.g., glass, plastic, and the like. The electrochromic device 105 may also include counter electrode (CE) layer 128 in contact with the first TC layer 124, electrochromic electrode (EC) layer 130 in contact with the second TC layer 126, and ionic conductor (IC) layer 132 "sandwiched" in-between CE layer 128 and EC layer 130. Electrochromic system 100 may include power supply 140 which may provide regulated current or voltage to electrochromic device 105. Transparency of electrochromic device 105 may be controlled by regulating density of charges (or lithium ions) in CE layer 128 and/or EC layer 130 of electrochromic device 105. For instance, when power supply 140 applies a positive voltage to the first TC 124, lithium ions may be driven across IC layer 132 and inserted in to EC layer 130. Simultaneously, charge-compensating electrons may be extracted from CE layer 128, flow across the external circuit, and get inserted into EC layer 130. Transfer of lithium ions and associated electrons from CE layer 128 to EC layer 130 may cause electrochromic device 105 to become darker—e.g., the visible light transmission or % T of electrochromic device 105 may decrease. Reversing the voltage polarity may cause the lithium ions and associated charges to return to their original layer, CE layer 128, and as a result, electrochromic device 105 may return to a clearer or more transparent state—e.g., the visible light transmission or % T of electrochromic device 105 may increase.

Figure 2:
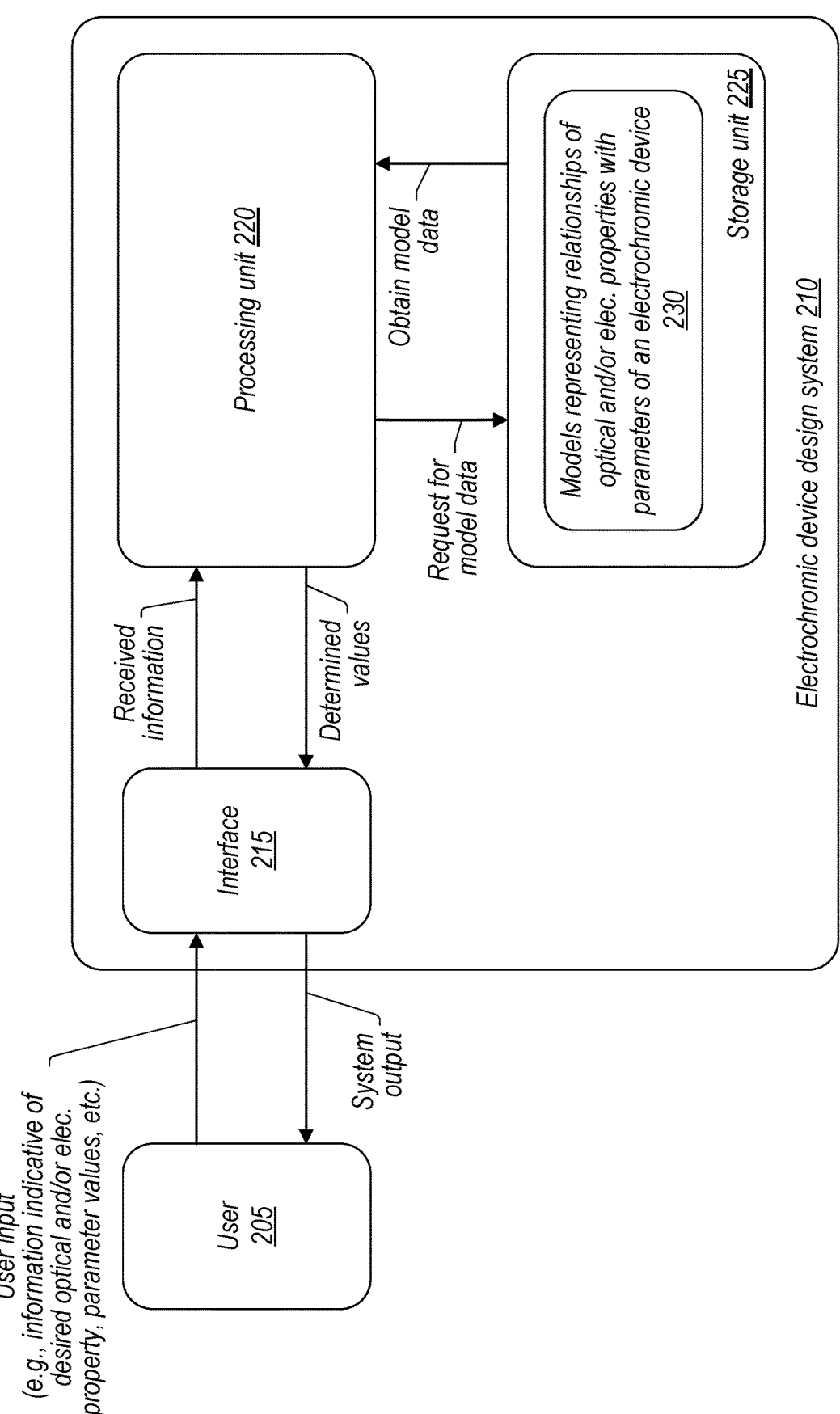
FIG. 2 shows an example electrochromic device design system, according to some embodiments.

FIG. 2 shows an example electrochromic device design system, according to some embodiments. As indicated in FIG. 2, in some embodiments, electrochromic device design system 210 may include processing unit 220 and storage unit 225. For instance, electrochromic device design system 210 may be implemented using one or more computing devices that may include one or more processors and associated memory, according to some embodiments. In some embodiments, electrochromic device design system 210 may include interface 215 to provide interactive functions with user 205. In some embodiments, interface 215 may be implemented in various forms, e.g., a graphic user interface, a command line interface, a website, an application programming interface (API), and the like that may provide the interactive functions between electrochromic device design system 210 and user 205. In some embodiments, electrochromic device design system 210 may receive an input, such as information indicative of desired optical and/or electrical properties of an electrochromic device (e.g., electrochromic device 105 in FIG. 1), via interface 215, which may be further obtained by processing unit 220. In some embodiments, the optical property may include the level of transparency, contrast, coloration efficiency, and/or colors of the electrochromic device, whilst the electrical property may refer to the corresponding control voltage, current, and/or leakage current of the device. In some embodiments, storage unit 225 of electrochromic device design system 210 may store one or more models representing respective relationships of the desired optical and/or electrical properties of the electrochromic device with respect to one or more parameters of the electrochromic device. As described below, in some embodiments, the parameters may include a thickness of the CE layer of the electrochromic device, a thickness of the EC layer, a ratio of the thickness between the CE and EC layer, the amount of mobile lithium ions within the electrochromic device, and the deposition temperature of the electrochromic device. In response to the input received from user 205, processing unit 220 may access storage unit 225 and obtain one or more of the models, determine the values for one or more of the parameters of the electrochromic device according to the input received from user 205 and the models obtained from storage unit 215, and accordingly adjust the parameters to control the optical and/or electrical properties of the electrochromic device to the desired values. During this adjustment process, electrochromic device design system 210 may provide an output such as information indicative of the adjustment status, the electrochromic device optical and/or electrical properties of the electrochromic device, etc., to user 205 via interface 215.

In some embodiments, instead of providing information indicative of optical and/or electrical properties of an electrochromic device, user 205 may provide an input indicative of the values of one or more parameters of the electrochromic device to electrochromic device design system 210 through interface 205. In response, processing unit 220 obtain one or more models from storage unit 225, determine corresponding optical and/or electrical properties of the electrochromic device based on the received input and obtained models, and provide an output indicative of the determined optical and/or electrical properties to user 205. In turn, user 205 may view the output provided by electrochromic device design system 210 via interface 215, and play around different values for the parameters of the electrochromic device until desired optical and/or electrical properties are achieved.

Figure 3:
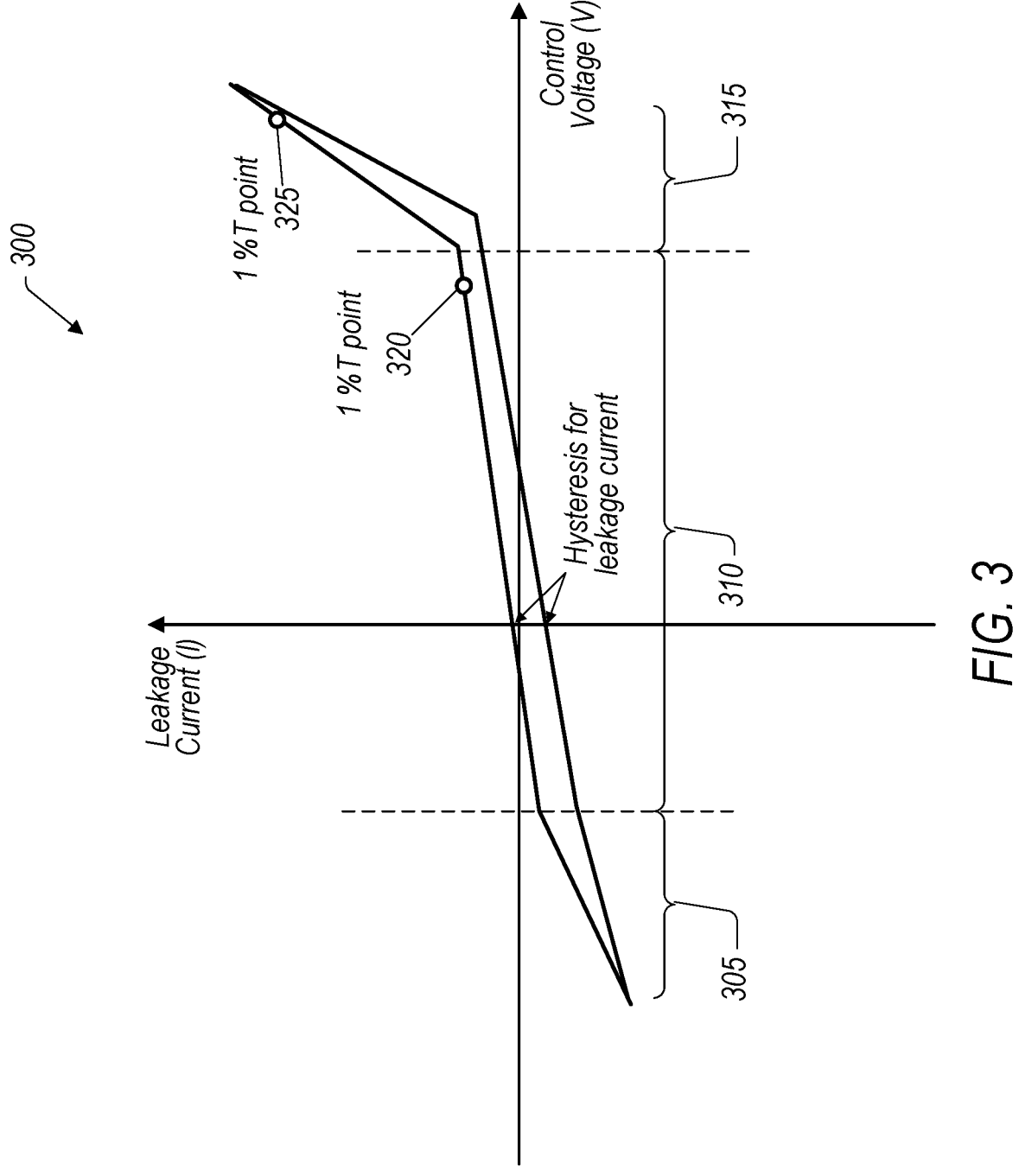
FIG. 3 shows a schematic model representing an example relationship between the leakage current (I) and control voltage (V) of an electrochromic device, according to some embodiments.

FIG. 3 shows a schematic model representing an example relationship between the leakage current (I) and control voltage (V) of an electrochromic device, according to some embodiments. In this example, X-axis represents values of the control voltage of the electrochromic device, whilst Y-axis represents values of the leakage current. Therefore, according to the above descriptions, the positive voltage corresponds to a tinting voltage—e.g., a voltage causing the electrochromic device to become darker, whilst the negative voltage corresponds to a clearing voltage—e.g., a voltage causing the electrochromic device to become clearer. As shown in FIG. 3, curve 300 may be viewed to include three regions 305, 310, and 315, divided approximal around some turning points along curve 300. In particular, as shown in FIG. 3, in this example, region 310 may have lowest slope(s) than regions 305 and 315. In addition, in some embodiments, the electrochromic device may possess certain level of hysteresis for the leakage current and/or control voltage. Hysteresis means that the state of the electrochromic device at a point-in-time may depend on its previous history, such as when the control voltage reaches zero, the corresponding leakage current does not return to zero. In this example, the electrochromic device may be designed to achieve 1% T at either of two example control points, as indicated by dots 320 and 325. In some embodiments, it may be desirable to select the optical and electrical properties of the electrochromic device such that the electrochromic device may reach 1% T at control point 320 rather than 325. This way, the electrochromic device may reach the desired level of visible light transmission (e.g., 1% T) with less control voltage and leakage current at control point 320 than control point 325. In other words, in some embodiments, it may be preferred to design parameters of an electrochromic device such that it may provide the optical and electrical properties to operate along a linear region with lower or lowest slopes (e.g., region 315) to achieve better controllability.

Figure 4:
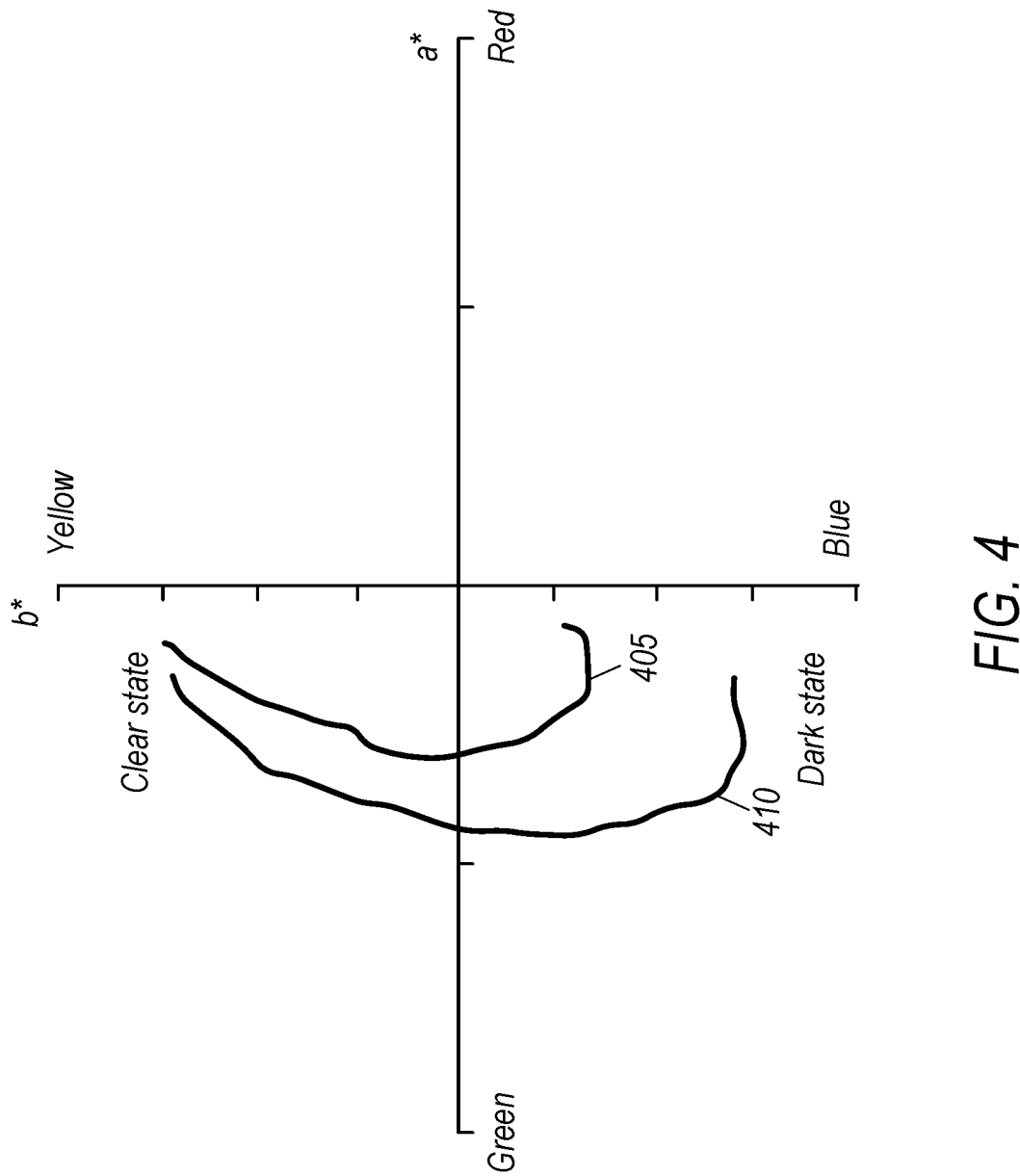
FIG. 4 shows a schematic model representing an example relationship between coloration efficiency and relative charge of electrochromic devices with respect to the deposition temperature of an electrochromic device, according to some embodiments.

FIG. 4 shows a schematic diagram illustration the impact of deposition temperature on the coloration property of an electrochromic device at different EC layer thicknesses, according to some embodiments. In this example, X-axis represent the parameter a* which indicates the change of color from green to red when a* changes from negative to positive values, whilst Y-axis represents the parameter b* which indicates the change of color from blue to yellow when b* changes from negative to positive values. The change of color may cause the change of the clearness or transparency of the electrochromic device. For example, curve 405 may indicate a full operating range of an electrochromic device when it changes from clear (e.g., corresponding to the top segment) to dark (e.g., corresponding to the bottom segment) at certain electrical and/or optical parameters. In some embodiments, the coloration efficiency may be adjusted by changing a phase morphology of the electrochromic device by adjusting the processing conditions. For instance, in some embodiments, the electrochromic device may include one or more chromogenic materials, e.g., tungsten oxide (WOx), nickel oxide (NiO), iridium oxide (IrOx), and the like). If crystalline WOx has a strong coloration efficiency than amorphous WOx, the fraction of crystalline WOx may be increased by increasing the temperature during deposition. Therefore, for each charge added, there may be a larger % T change in the electrochromic device. Optimizing the coloration efficiency may allow the electrochromic device to reach the desired % T before onset of the leakage current. In some embodiments, the electrochromic device may be operated between zero and 50% relative charge. curve 405 represents a curve of an electrochromic device using one deposition temperature to dope lithium ions, curve 410 represents a curve of an electrochromic device using another deposition temperature for doping lithium ions. In this example, the electrochromic device may have a larger average coloration efficiency with a lower deposition temperature (as indicated by curve 405) than a higher deposition temperature (as indicated by curve 410). Thus, by increasing the temperature, the operating curve of the electrochromic device may be moved to the left, e.g., from curve 405 to curve 410. Therefore, in some embodiments, it may be preferred to increase the deposition temperature in order to increase the coloration efficiency of an electrochromic device.

Figure 5:
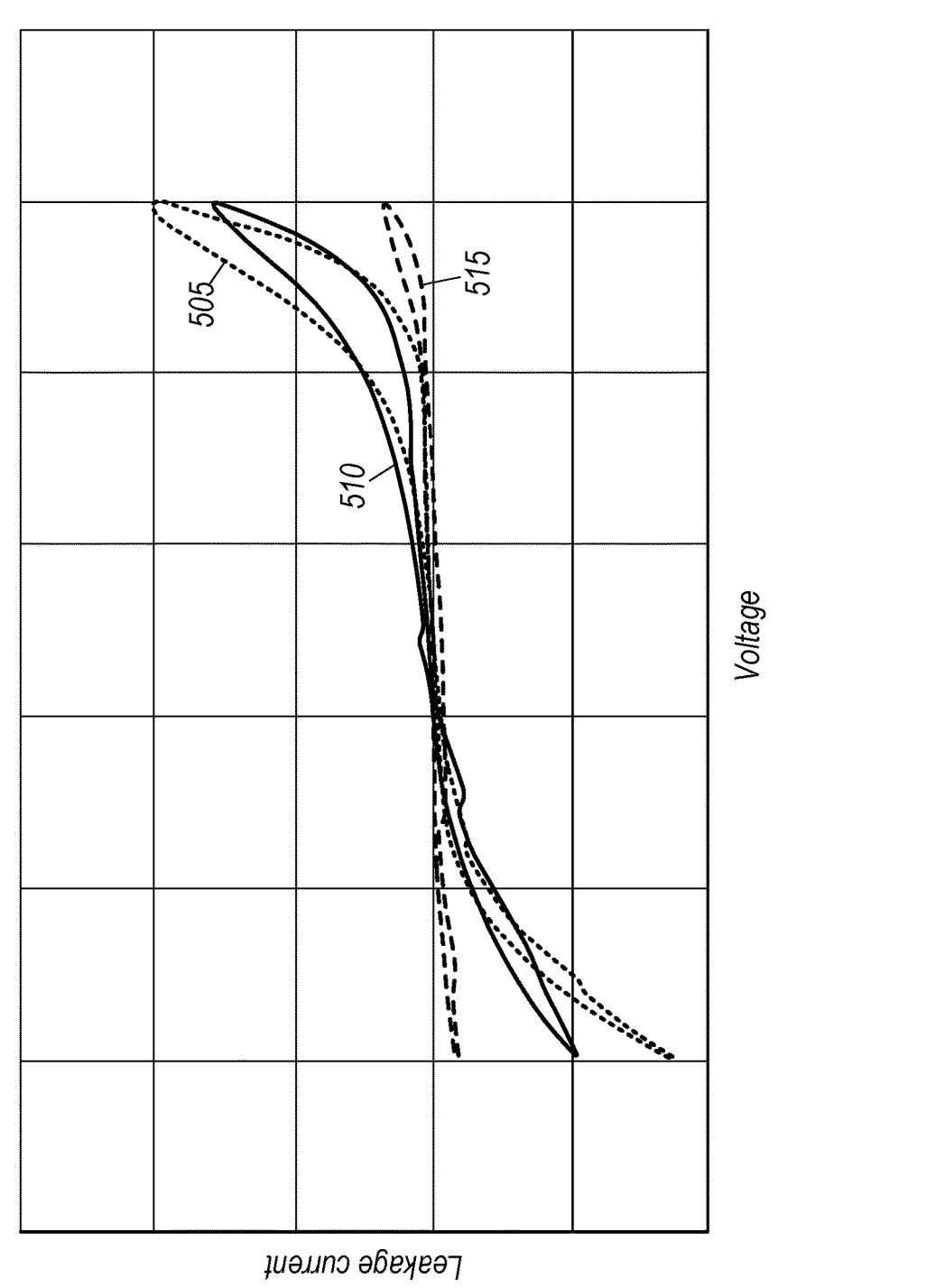
FIG. 5 shows a schematic model representing a relationship between current and control voltage of electrochromic devices with respect to the thickness of the CE layer, according to some embodiments.

FIG. 5 shows a schematic model representing a relationship between current and control voltage of electrochromic devices with respect to the thickness of the CE layer, according to some embodiments. In this example, X-axis represents the control voltage applied to the electrochromic device, whilst Y-axis represents the leakage current of the electrochromic device. Curve 505 may represent the relationship between the leakage current and control voltage of an electrochromic device having 75% CE thickness, curve 510 may represent the relationship for 100% CE thickness, and curve 515 may represent the corresponding to 125% CE thickness. As shown in FIG. 5, the increase of the CE thickness (e.g., increasing from 75%-125%) may lower the current of an electrochromic device and delay the onset of leakage current—e.g., the steeper slope region does not occur until higher voltages. Therefore, in some embodiments, it may be preferred to increase thickness of the CE layer of an electrochromic device.

Figure 6:
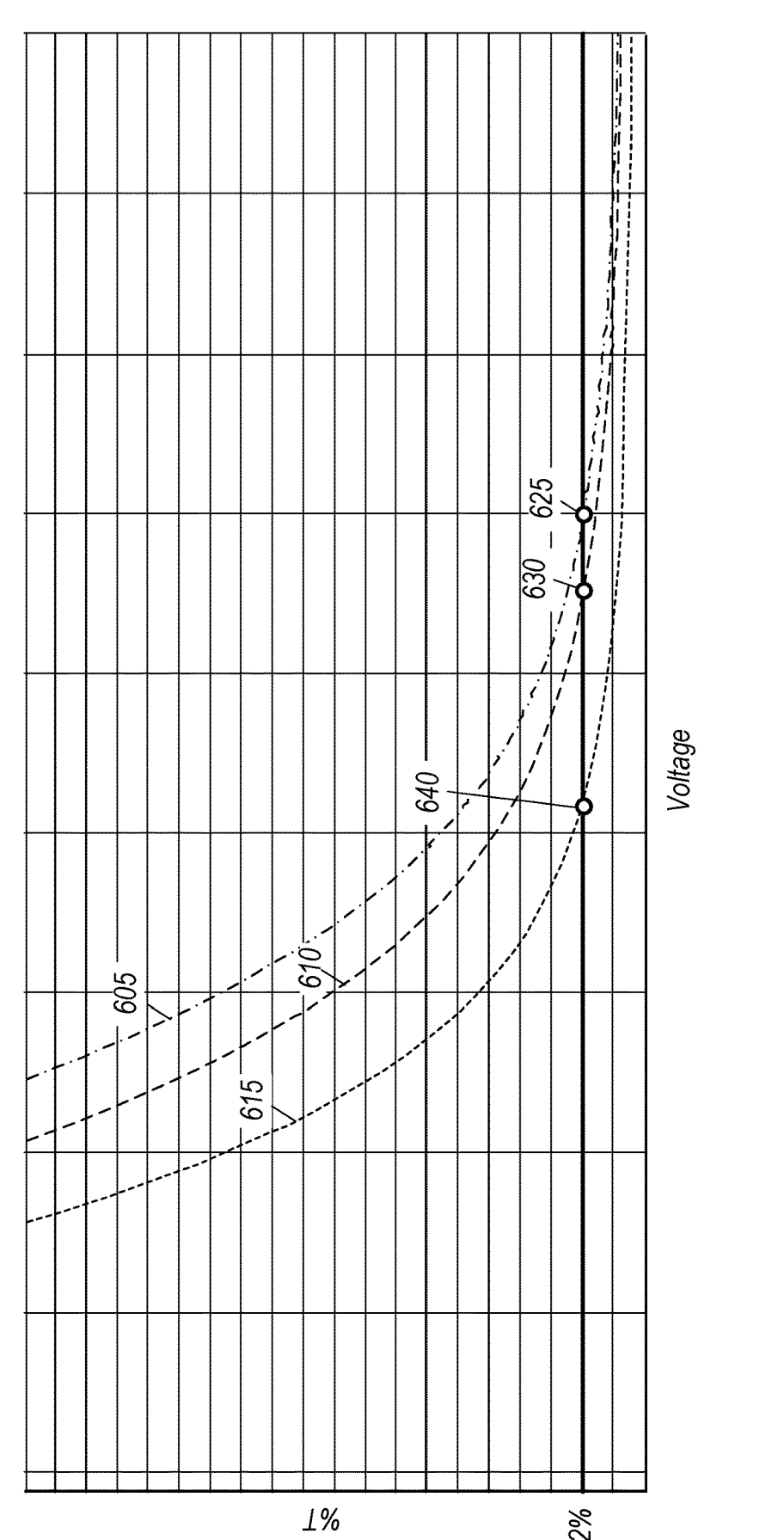
FIG. 6 shows a schematic model representing an example relationship between the level of visible light transmission or % T and control voltage of electrochromic devices with respect to the thickness of EC layer, according to some embodiments.

FIG. 6 shows a schematic model representing an example relationship between the level of visible light transmission or % T and control voltage of electrochromic devices with respect to the thickness of EC layer, according to some embodiments. In this example, X-axis represents the control voltage, whilst Y-axis represents the level of visible light transmission or % T. Curve 610 may represent the relationship of an electrochromic device having a standard EC layer thickness, curve 615 may represent the relationship when the EC layer thickness is increased by 25% (e.g., 1.25 times standard EC layer thickness), and curve 615 may represent the relationship when the EC layer thickness is decreased by 50% (e.g., 0.5 times standard thickness). In some embodiments, the standard EC layer thickness may be 260 nanometers. As shown in FIG. 6, at a given EC layer thickness, as shown by curve 610, increasing the supply voltage may reduce % T to make the electrochromic device darker, while decreasing the supply voltage may increase % T to make the electrochromic device clearer or more transparent. Further, as indicated by the change of points 625, 630, and 640 at 2% T or 2% tint level, increasing the EC layer thickness may lower the control voltage required to reach a given tint level, while decreasing the EC layer thickness may have an opposite effect. The effect of increasing or decreasing the EC layer thickness with respect to the % T-V relationship may be modeled for use in design of an electrochromic device such as shown in FIG. 2.

Figure 7:
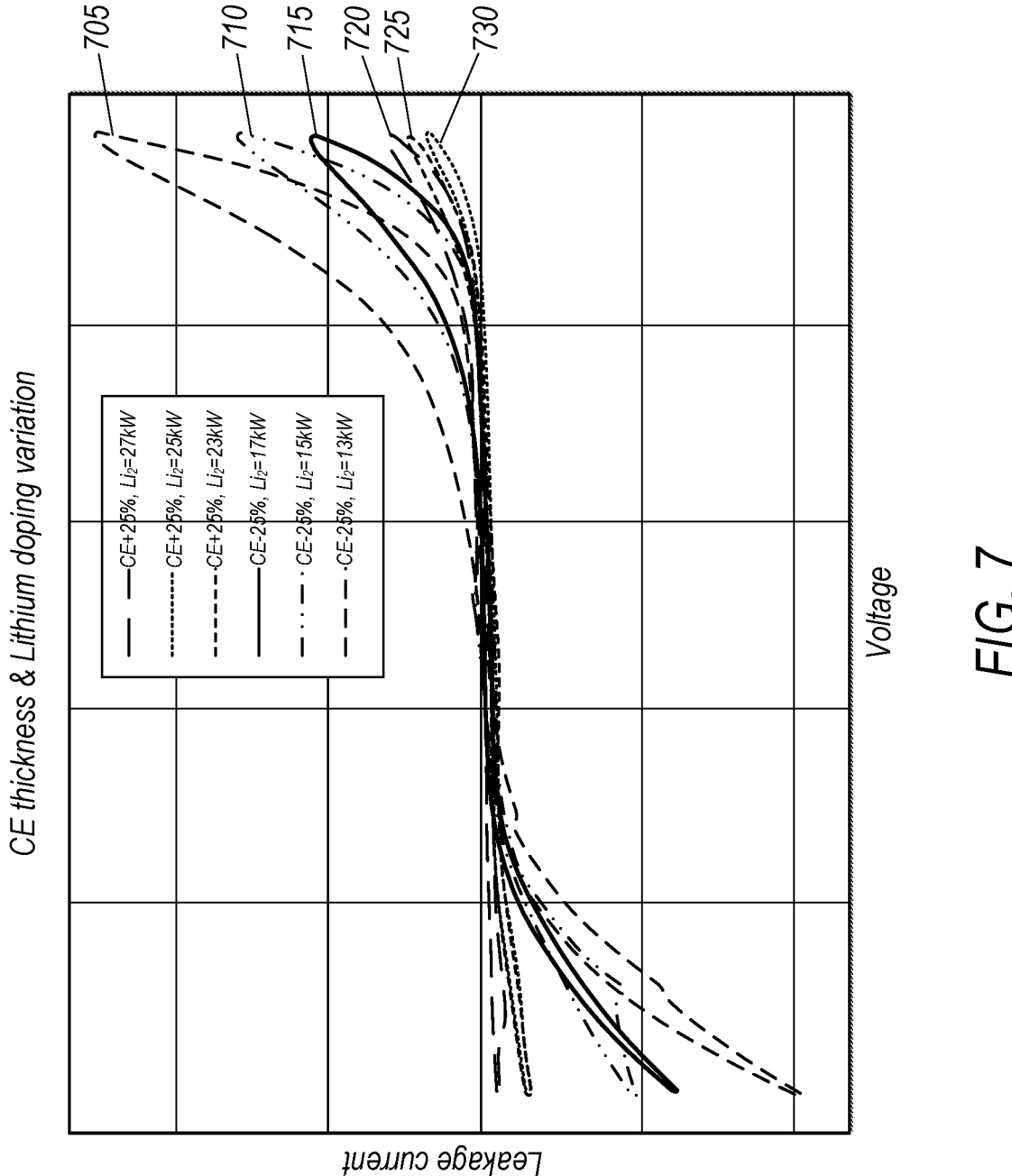
FIG. 7 shows a schematic model representing a relationship between current and control voltage of an electrochromic devices with respect to the amount of lithium doping, according to some embodiments.

FIG. 7 shows a schematic model representing a relationship between a leakage current of an electrochromic devices with respect to the amount of lithium doping and thickness of the CE layer (at several voltages), according to some embodiments. In this example, X-axis represents values of the control volage, whilst Y-axis represents values of the leakage current. Curve 705 may represent the relationship between the control voltage and leakage current of an electrochromic device using 13 kW for doping the lithium ions with 75% thickness of the CE layer (e.g., the CE thickness is reduced by 25%), curve 710 may represent the relationship of the electrochromic device using 15 kW for doping the lithium ions with 75% thickness of the CE layer, curve 715 may represent the relationship of the electrochromic device using 17 kW for doping the lithium ions with 75% thickness of the CE layer, curve 720 may represent the relationship of the electrochromic device using 23 kW for doping the lithium ions with 125% thickness of the CE layer (e.g., the CE thickness is increased by 25%), curve 725 may represent the relationship of the electrochromic device using 25 kW for doping the lithium ions with 125% thickness of the CE layer, and curve 730 may represent the relationship of an electrochromic device using 27 kW for doping the lithium ions with 125% thickness of the CE layer. The higher value of the power means that a larger amount of lithium ions is added to an electrochromic device using a doping process. As shown in FIG. 7, the increase of the amount of doped lithium ions (e.g., as indicated by the power increasing from 13 kW to 27 kW) may lower the current of an electrochromic device and delay the onset of leakage current. Therefore, in some embodiments, it may be preferred to increase the amount of lithium ions added to an electrochromic device.

In some embodiments, the ratio of the thickness between the CE and EC layers of an electrochromic device may be adjusted to control the optical and electrical properties of the electrochromic device. The ratio of the thickness between the CE and EC layers may affect the ratio of capacities of the two layers for holding lithium ions. This may determine the amount of lithium ions being able to move from one layer to another, and thus affect the tint level of the electrochemical device at a given supply voltage.

In combination of the above descriptions with regards to FIGS. 1-7, in some embodiments, it may be possible to tune the optical and electrical properties of an electrochromic device by adjusting one or more specific parameters. In some embodiments, the parameters may include thickness of the CE layer, thickness of the EC layer, ration of thickness between the CE and EC layer, the amount of mobile lithium ions within the electrochromic device, and the deposition temperature of the electrochromic device. FIGS. 8A-8G show example optical simulation results of an electrochromic device, according to some embodiments. The results are extracted from optical simulations of the electrochromic device integrated into an insulated glazing unit. For purposes of illustration, in these examples, the EC layer of the electrochromic device is assumed thicker than the CE layer. An optimal design among the example results may depend on a targeted optical property, e.g., a maximum amount of transmitted light in the clear state, a minimum amount of transmitted light in the dark state, a maximum contrast (e.g., the ratio between the amounts of transmitted light in the clear state and dark state), or neutral colors in the clear or dark state.

Figure 8A:
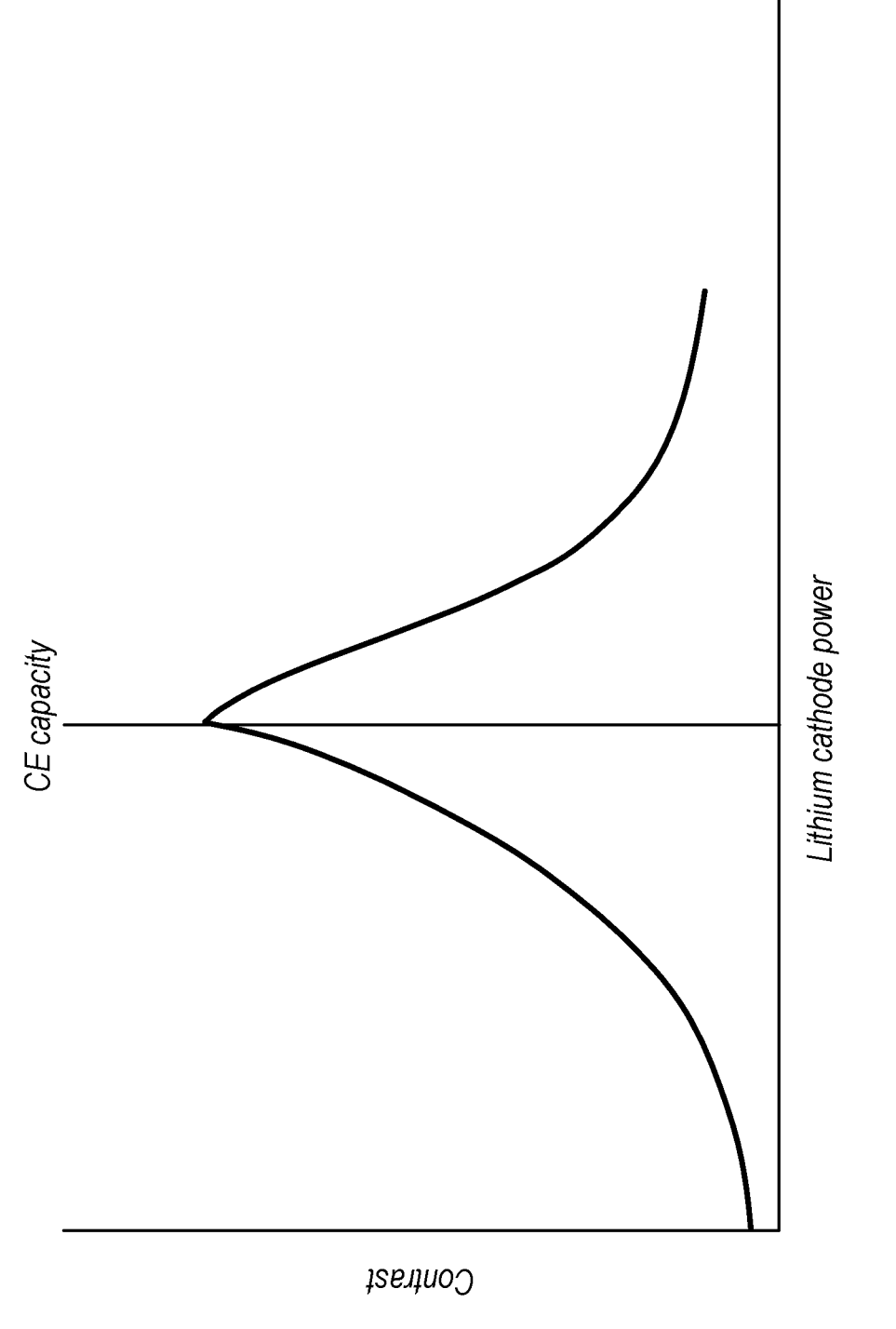
FIGS. 8A-8G show example optical simulation results of an electrochromic device, according to some embodiments.
Figure 8B:
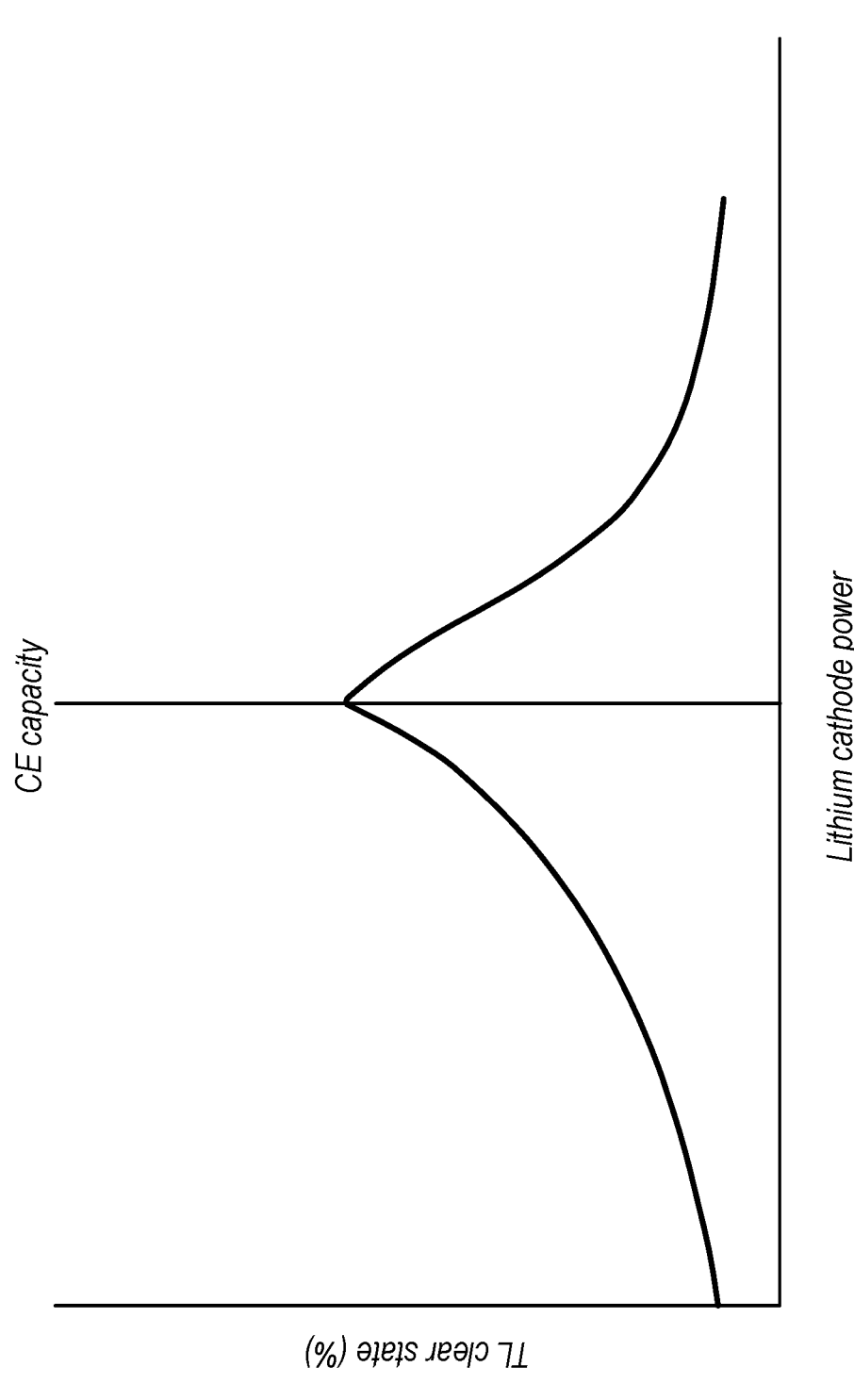
Figure 8C:
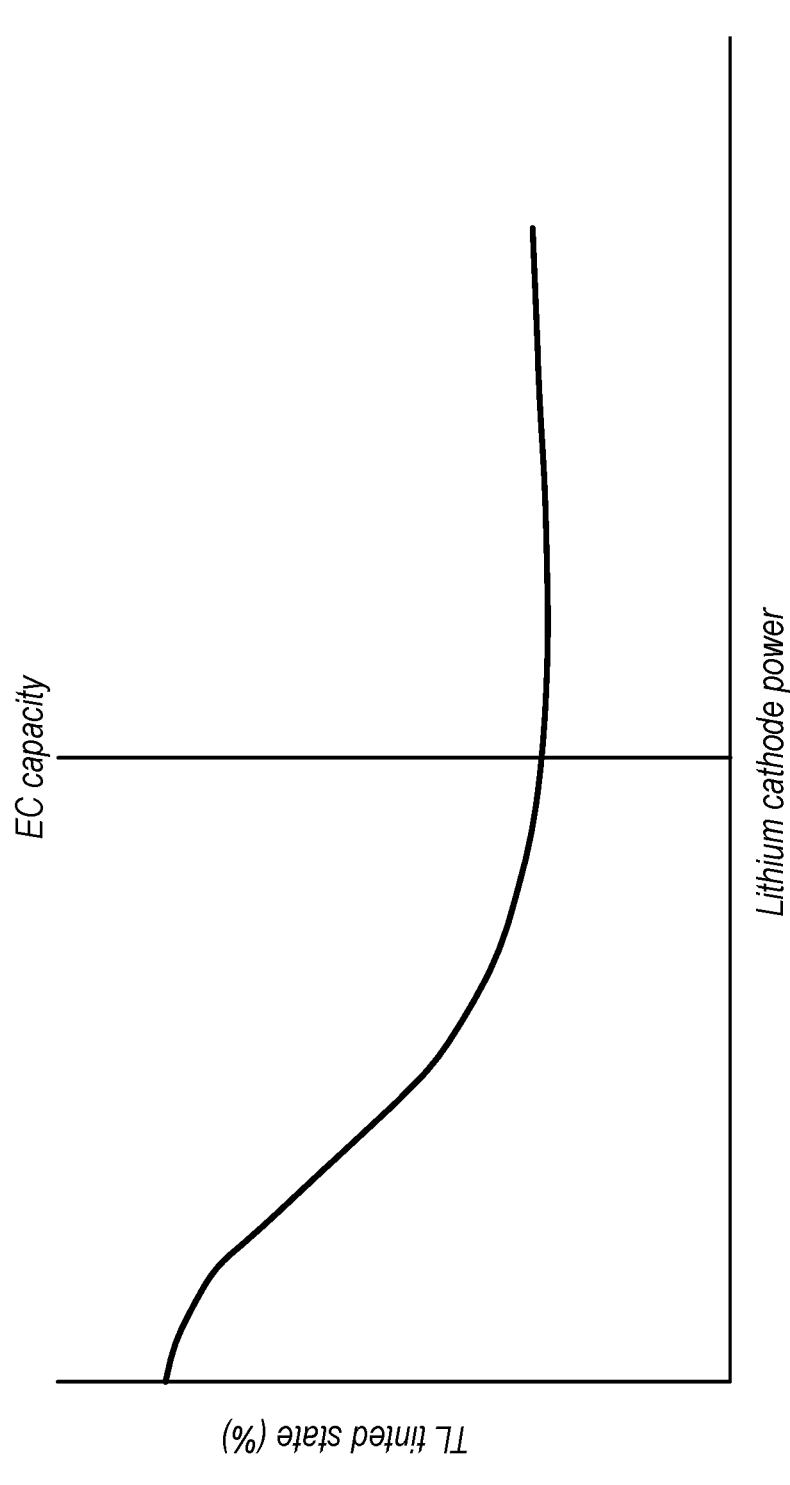

Tuning of the Quantity of Lithium Ions within an Electrochromic Device:

In some embodiments, the mobile lithium quantity may affect the contrast of an electrochromic device. In some embodiments, the mobile lithium quantity may be adjusted by controlling the lithium cathode power applied during production of the electrochromic device. As shown in FIG. 8A, because the EC layer of the electrochromic device is assumed thicker than the CE layer in this example, the electrochromic device may achieve a highest contrast when the lithium cathode power indicates an amount of lithium ions equal to the capacity of the CE layer. Here, the capacity may broadly refer to the maximum amount of lithium ions that the CE layer may contain. The highest contrast in FIG. 8A may correspond to a configuration where the CE layer is full of lithium ions whilst the EC layer is empty in a clear state (e.g., corresponding to the highest % clear state), as shown in FIG. 8B. Conversely, the electrochromic device may continuously transition to a darker state (e.g., corresponding to a higher % tinted state) as the EC layer is filled up with lithium ions, as shown in FIG. 8C. Note that because in these examples the EC layer is thicker than the CE layer, the amount of lithium ions may still remain below the capacity of the EC layer, as shown in FIG. 8C.

Figure 8D:
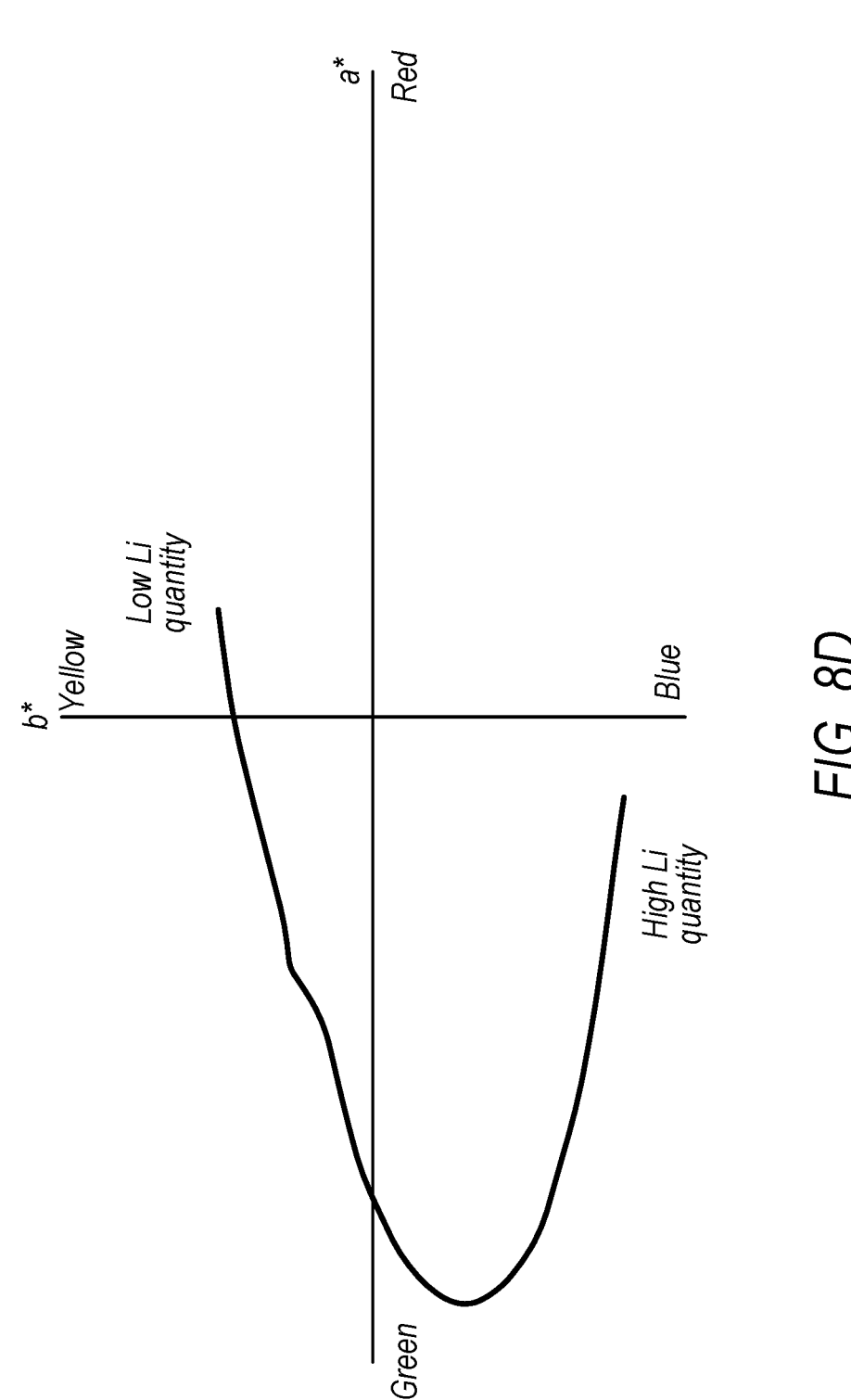
Figure 8E:
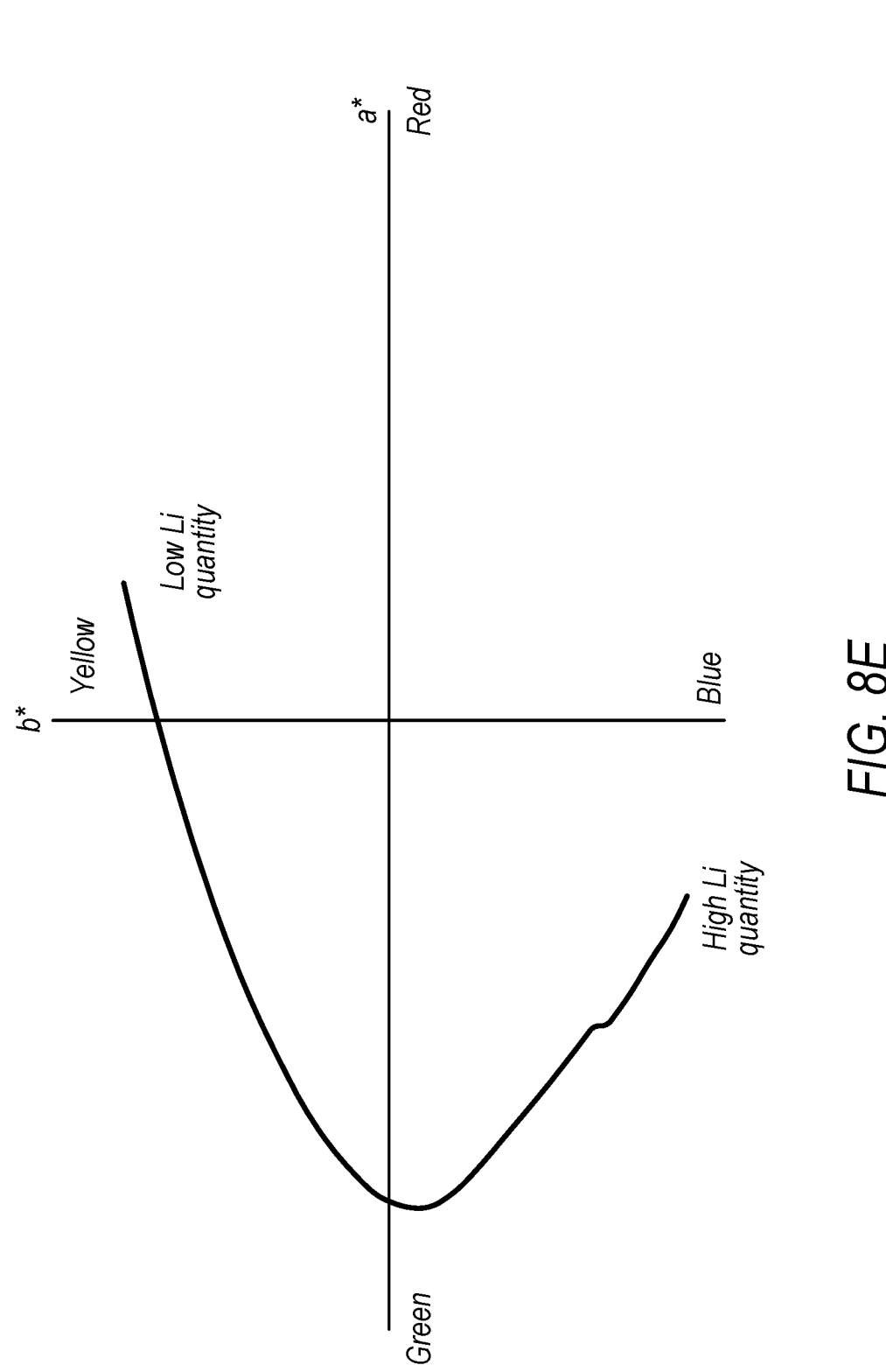

In some embodiments, adjustment of the quantity of mobile lithium ions within an electrochromic device may also change the color of the electrochromic device in clear and/or dark states, as shown above in FIGS. 6-7. FIGS. 8D-8E show the change of color of an example electrochromic device in clear and dark states, respectively, according to some embodiments. Here, X-axis represents values of parameter a* which indicates the change of color from green to red when a* changes from negative to positive, Y-axis represents values of parameter b* which indicates the change of color from blue to yellow when b* changes from negative to positive. As shown in FIG. 8D, in a clear state (e.g., under a negative voltage), the color of the electrochromic device may change from yellow when both CE and EC layers are empty to blue when the CE layer is full and the EC layer is filling up. As shown in FIG. 8E, in a dark state (e.g., under a positive voltage), the color of the electrochromic device may change from yellow when both CE and EC layers are empty to blue as the EC layer is filling up with lithium ions (and the CE layer remains empty).

Figure 8F:
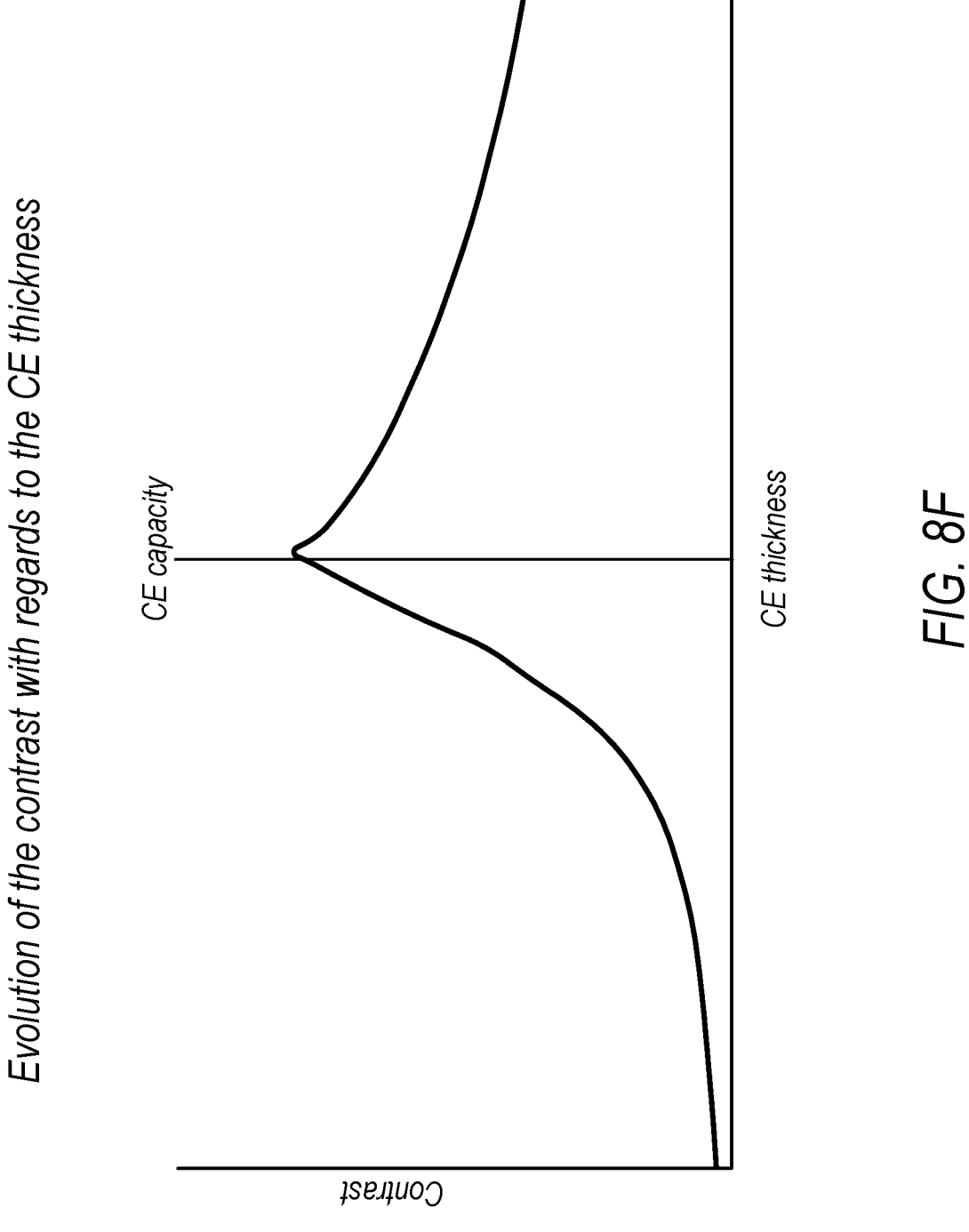
Figure 8G:
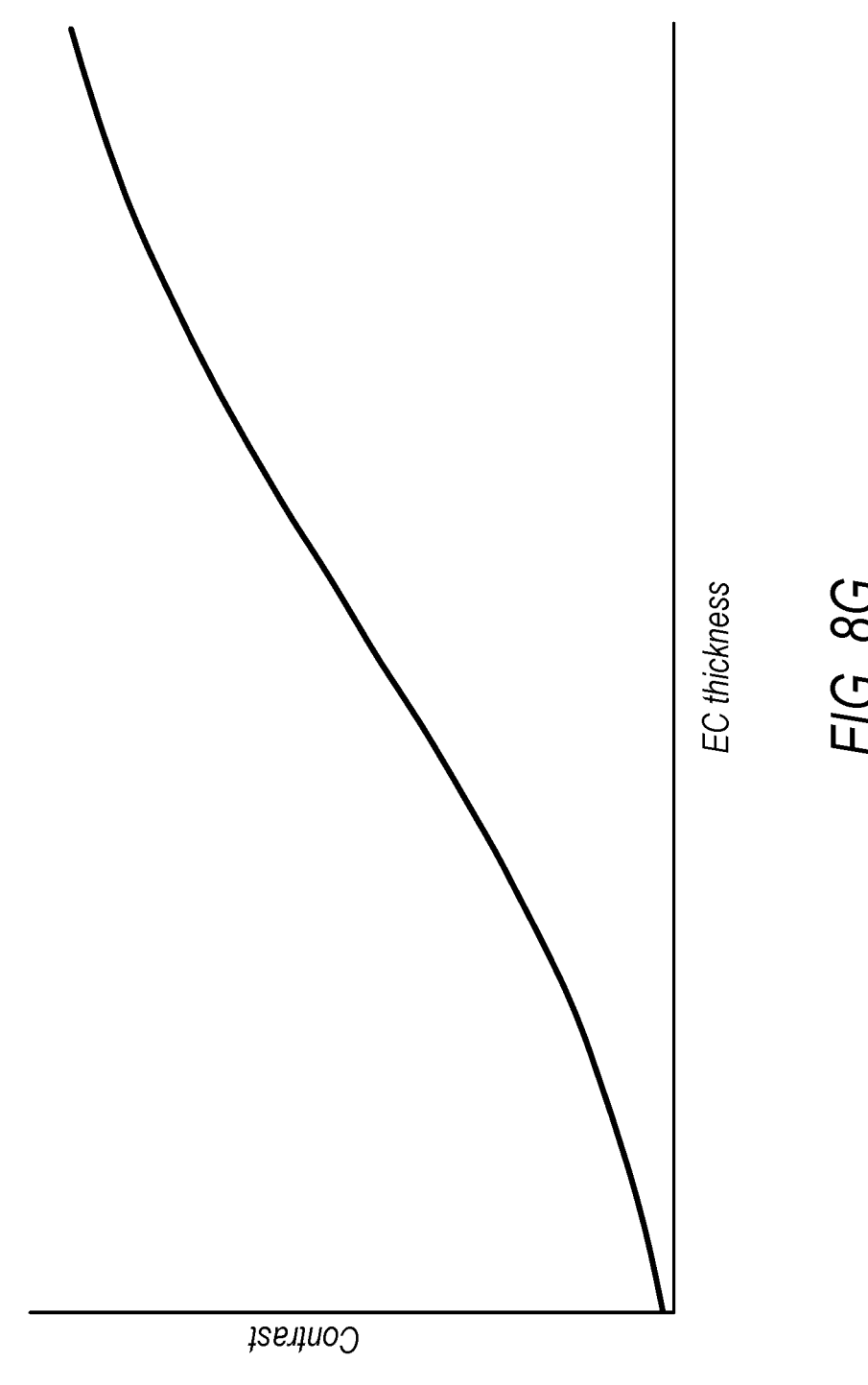

Tuning of Thickness of CE Layer and/or Thickness of EC Layer:

In some embodiments, given an amount of lithium ions within an electrochromic device, the thickness CE layer and/or thickness of EC layer may be adjusted to change the contrast and color in transition of the electrochromic device. For instance, when the amount of lithium ions and thickness of the EC layer are fixed, FIG. 8F shows that a maximum contrast may be reached when the total capacity of the CE layer matches the quantity of the lithium ions. If thickness of the CE layer is too small to accommodate the total lithium ions, some lithium ions may travel to the EC layer in the clear state and thus reduce the transparency level in the clear state. By contrast, if thickness of the CE layer is too large, the amount of lithium ion may be inferior to the CE layer capacity, and the CE layer may not be cleared to its maximum, thus darkening the clear state. When the quantity of the total lithium ions and thickness of CE layer are fixed to constant values, FIG. 8G shows that the contrast may increase as the EC layer becomes thicker, as shown in FIG. 8G.

FIG. 9 shows a high-level flowchart illustrating a method for simultaneously designing the optical and electrical properties of an electrochromic device by adjusting one or more parameters, according to some embodiments. In some embodiments, the method may include receiving an input indicative of desired optical and/or electrical properties of an electrochromic device, as indicated by block 905. As described above, in some embodiments, the input may be received at an electrochromic device design system via an interface (e.g., as described in FIG. 2). As shown in FIGS. 3-8, the optical property may include the level of transparency, contrast, coloration efficiency, and/or colors of the electrochromic device, whilst the electrical property may refer to the corresponding control voltage, current, and/or leakage current of the device. In some embodiments, the parameters may include a thickness of the CE layer, a thickness of the EC layer, a ratio of thickness between the CE and EC layer, the amount of mobile lithium ions within the electrochromic device, and the deposition temperature of the electrochromic device.

In some embodiments, one or more models representing relationships of the optical and/or electrical properties with respect to one or more of the parameters of the electrochromic device may be obtained, indicated by block 910. For instance, as described above, a processing unit of an electrochromic device design system may access and obtain the models stored in a storage unit or memory of the electrochromic device design system. In some embodiments, the one or more parameters for the electrochromic device may be adjusted according to the desired optical and/or electrical properties, using the obtained models, as indicated in block 915. For instance, in some embodiments, the thickness of the CE layer of the electrochromic device may be increased to simultaneously reduce the current and increase coloration efficiency. As described above, this may allow the optical and/or electrical properties of the electrochromic device to be simultaneously adjusted.

In some embodiments, the adjustment of the specific parameters may be an interactive process. For instance, during the process, the optical and/or electrical properties of the electrochromic device may be continuously updated and determined whether or not they reach the desired values as indicated in the received input, e.g., by a user or by the electrochromic device design system, as indicated in block 920. In some embodiments, if the optical and/or electrical properties of the electrochromic device have not reached the desired values, one or more models may be further accessed and/or one or more parameters may be further adjusted. Otherwise, if the optical and/or electrical properties of the electrochromic device reach the desired values, an output indicative of the final values of the parameters of the electrochromic device may be provided, e.g., via the interface of the electrochromic device design system, as indicated in block 925.

Figure 10:
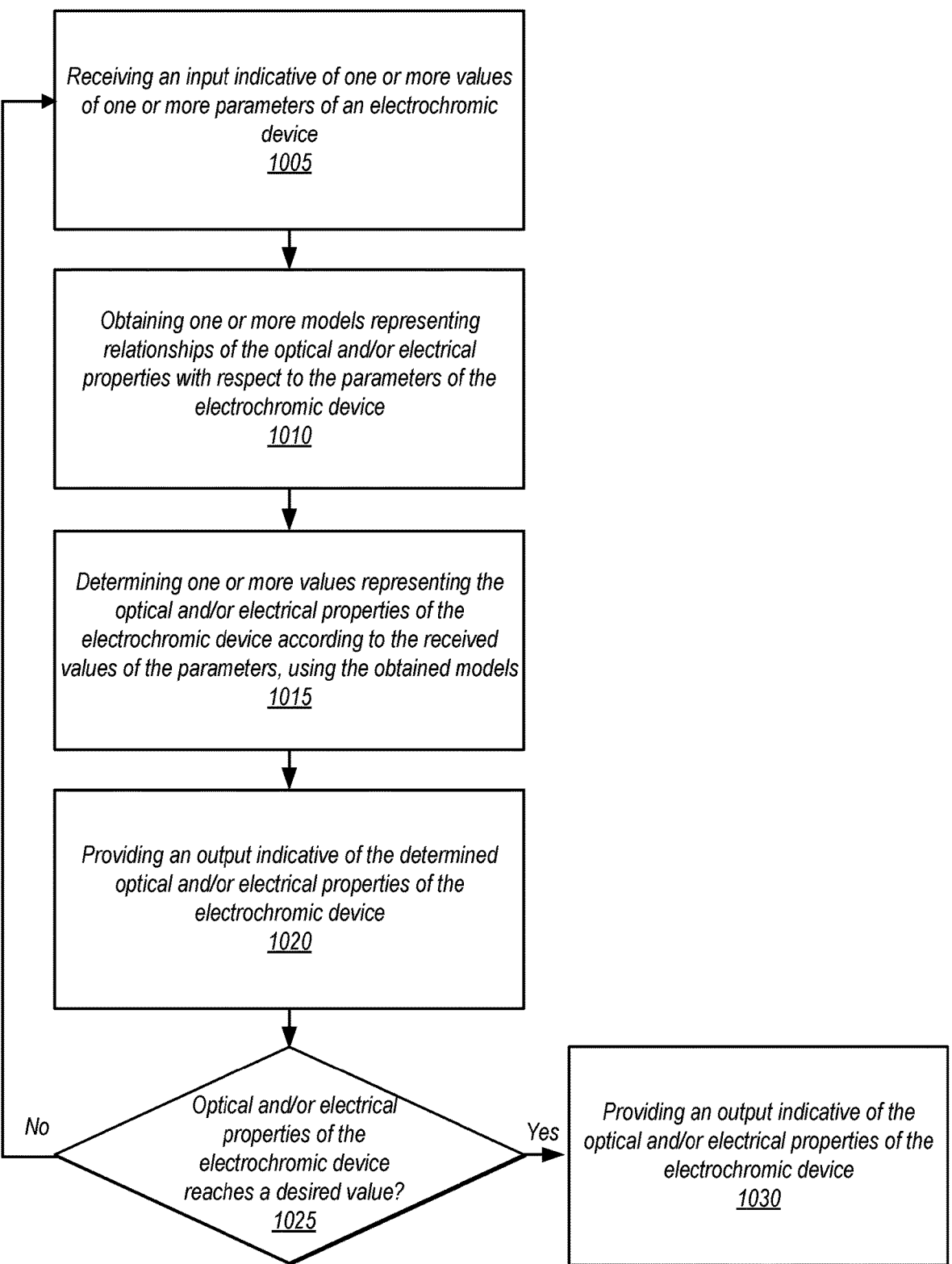
FIG. 10 shows a high-level flowchart illustrating a method for adjusting one or more parameters of an electrochromic device according to received optical and electrical properties, according to some embodiments.

FIG. 10 shows a high-level flowchart illustrating a method for adjusting one or more parameters of an electrochromic device according to received optical and electrical properties, according to some embodiments. As indicated in FIG. 10, in some embodiments, an input indicative of one or more values of one or more parameters of an electrochromic device may be received, e.g., at an electrochromic device design system via an interface from a user (e.g., as described in FIG. 2), as indicated in block 1005. In response, in some embodiments, one or more models representing relationships of the optical and/or electrical properties with respect to the parameters of the electrochromic device may be obtained, as indicated in block 1010. In some embodiments, one or more values representing the optical and/or electrical properties of the electrochromic device according to the received values of the parameters, using the obtained models, as indicated in block 1015. In some embodiments, an output indicative of the determined optical and/or electrical properties of the electrochromic device may be provided, e.g., via the interface of the electrochromic device design system to the user, as indicated in block 1020. In some embodiments, it may be determined whether or not the optical and/or electrical properties of the electrochromic device reaches the desired values as indicated in the received input, e.g., by the user or by the electrochromic device design system, as indicated in block 1025. In some embodiments, if the optical and/or electrical properties of the electrochromic device have not reached the desired values, the values of one or more parameters may be further provided. Otherwise, if the optical and/or electrical properties of the electrochromic device reach the desired values, an output indicative of the final values of the optical and/or electrical properties of the electrochromic device may be provided, e.g., via the interface of the electrochromic device design system, as indicated in block 1030.

Note that FIGS. 9-10 are presented only as examples for purposes of illustration, and shall not limit the scope of the present disclosure. In some embodiments, the order of the blocks of the methods in FIGS. 9-10 may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various operations and components are somewhat arbitrary, and particular operations are illustrated in the context of specific illustrative configurations. Other allocations of functionality are envisioned and may fall within the scope of claims that follow. These and other variations, modifications, additions, and improvements may fall within the scope of embodiments as defined in the claims that follow.

Figure 11:
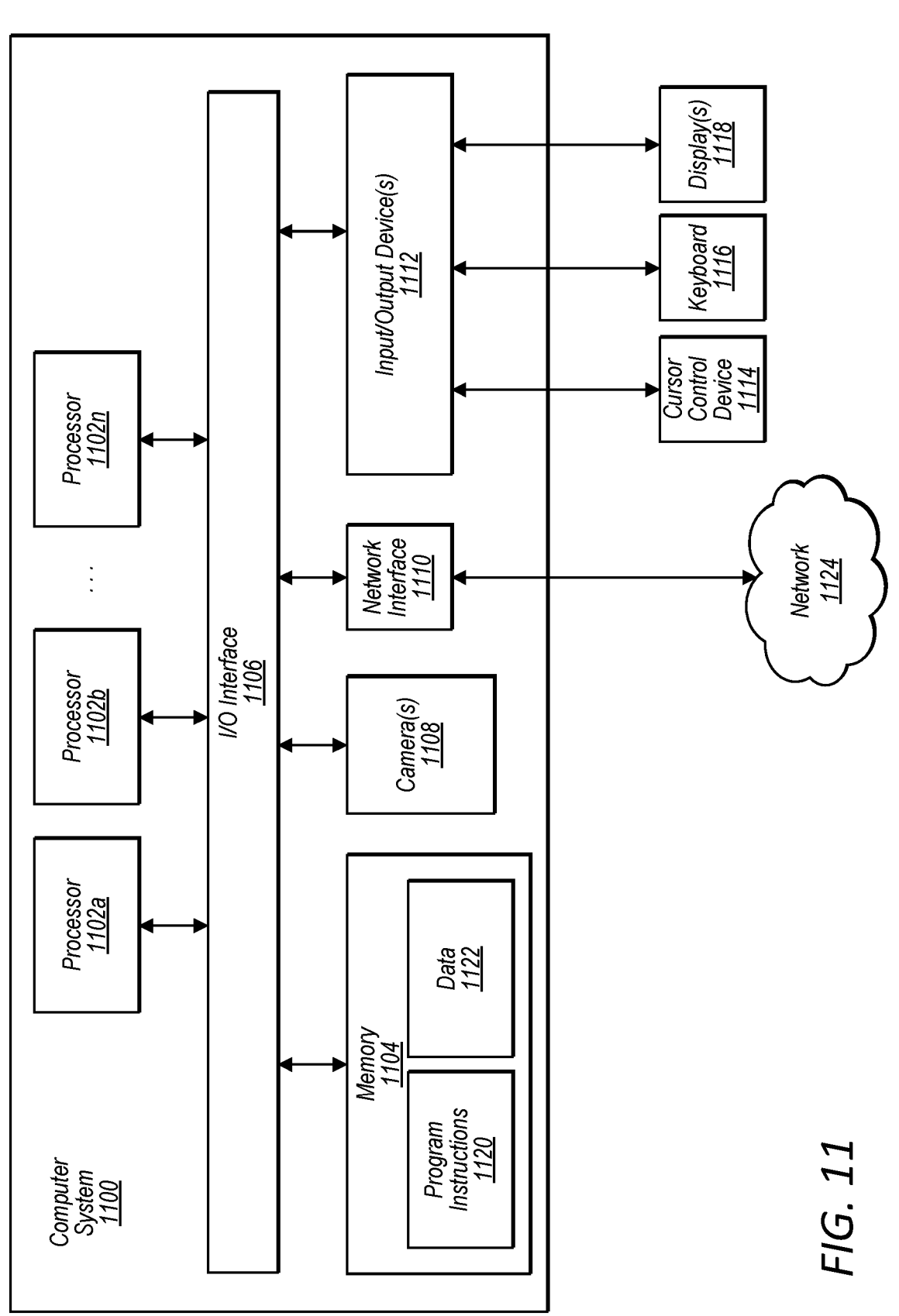
FIG. 11 shows a schematic block diagram of an example computer system that may be used to implement an electrochromic device design system, according to some embodiments.

FIG. 11 shows a schematic block diagram of an example computer system that may be used to implement an electrochromic device design system, e.g., as described herein with reference to FIGS. 1-10, according to some embodiments. The computer system 1100 may be configured to execute any or all of the embodiments described above. In different embodiments, computer system 1100 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1100 includes one or more processors 1102 coupled to a system memory 1104 via an input/output (I/O) interface 1106. Computer system 1100 further includes one or more cameras 1108 coupled to the I/O interface 1106. Computer system 1100 further includes a network interface 1110 coupled to I/O interface 1106, and one or more input/output devices 1112, such as cursor control device 1114, keyboard 1116, and display(s) 1118. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1102, or a multiprocessor system including several processors 1102 (e.g., two, four, eight, or another suitable number). Processors 1102 may be any suitable processor capable of executing instructions. For example, in various embodiments processors 1102 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 1102 may include additional types of processors, such as graphics processing units (GPUs), application specific integrated circuits (ASICs), etc. In multiprocessor systems, each of processors 1102 may commonly, but not necessarily, implement the same ISA. In some embodiments, computer system 1100 may be implemented as a system on a chip (SoC). For example, in some embodiments, processors 1102, memory 1104, I/O interface 1106 (e.g. a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1104 may be configured to store program instructions 1120 accessible by processor 1102. In various embodiments, system memory 1104 may be implemented using any suitable memory technology, such as static random access memory (SRAM), synchronous dynamic RAM (SDRAM), nonvolatile/Flash-type memory, or any other type of memory. Additionally, existing camera control data 1122 of memory 1104 may include any of the information or data structures described above. In some embodiments, program instructions 1120 and/or data 1122 may be received, sent or stored upon different types of computer-accessible media or on similar media separate from system memory 1104 or computer system 1100. In various embodiments, some or all of the functionality described herein may be implemented via such a computer system 1100.

In one embodiment, I/O interface 1106 may be configured to coordinate I/O traffic between processor 1102, system memory 1104, and any peripheral devices in the device, including network interface 1110 or other peripheral interfaces, such as input/output devices 1112. In some embodiments, I/O interface 1106 may perform any necessary protocol, timing or other data transformations to convert data signals from one component (e.g., system memory 1104) into a format suitable for use by another component (e.g., processor 1102). In some embodiments, I/O interface 1106 may include support for devices attached through various types of peripheral buses, such as a variant of the Peripheral Component Interconnect (PCI) bus standard or the Universal Serial Bus (USB) standard, for example. In some embodiments, the function of I/O interface 1106 may be split into two or more separate components, such as a north bridge and a south bridge, for example. Also, in some embodiments some or all of the functionality of I/O interface 1106, such as an interface to system memory 1104, may be incorporated directly into processor 1102.

Network interface 1110 may be configured to allow data to be exchanged between computer system 1100 and other devices attached to a network 1124 (e.g., carrier or agent devices) or between nodes of computer system 1100. Network 1124 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1110 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1112 may, in some embodiments, include one or more display terminals, keyboards, keypads, touchpads, scanning devices, voice or optical recognition devices, or any other devices suitable for entering or accessing data by one or more computer systems 1100. Multiple input/output devices 1112 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1110.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method, comprising:
receiving, by an electrochromic device design system, information indicative of one or more desired properties for an electrochromic device, the one or more desired properties including at least one of:
    a desired optical property of the electrochromic device and including at least one of a level of transparency in a clear state, a level of transparency in a dark state, a contrast, a coloration efficiency, a color in the clear state, or a color in the dark state, or
    a desired electrical property of the electrochromic device and including at least one of a control voltage, a current, or a leakage current;
obtaining, by the electrochromic device design system, one or more models representing respective relationships of the desired optical property or the desired electrical property with respect to one or more parameters of the electrochromic device, wherein the one or more parameters include at least one of a deposition temperature, a thickness of a counter-electrode (CE) layer, a thickness of an electrochromic electrode (EC) layer, a ratio of the thickness between the CE layer and the EC layer, or an amount of lithium doping within the electrochromic device; and
adjusting, by the electrochromic device design system based on the obtained one or more models, at least one parameter of the one or more parameters for the electrochromic device to specify a new deposition temperature parameter, a new thickness of a counter-electrode (CE) layer parameter, a new thickness of an electrochromic electrode (EC) layer parameter, a new ratio of the thickness between the CE layer and the EC layer, or a new amount of lithium doping parameter for use in forming the electrochromic device to achieve the one or more desired properties for the electrochromic device.

2. The method of claim 1, wherein adjusting the at least one parameter of the one or more parameters for the electrochromic device comprises adjusting the thickness of the CE layer for the electrochromic device.

3. The method of claim 1, wherein adjusting the at least one parameter of the one or more parameters for the electrochromic device comprises adjusting the thickness of the EC layer for the electrochromic device.

4. The method of claim 1, wherein adjusting the at least one parameter of the one or more parameters for the electrochromic device comprises adjusting the amount of lithium doping for the electrochromic device.

5. The method of claim 1, wherein adjusting the at least one parameter of the one or more parameters for the electrochromic device comprises adjusting the ratio between the thickness of the EC layer and the thickness of the CE layer with respect to an amount of lithium doping for the electrochromic device.

6. The method of claim 1, wherein adjusting the at least one parameter of the one or more parameters for the electrochromic device comprises adjusting the deposition temperature to change phase morphology of the electrochromic device.

7. The method of claim 6, wherein adjusting the phase morphology of the electrochromic device comprises adjusting a fraction of crystalline phase of tungsten oxide ($WO_x$) within the electrochromic device.

8. The method of claim 1, wherein the desired optical property of the electrochromic device comprises a desired level of transparency of the electrochromic device with respect to at least one of a specified voltage applied across the electrochromic device or a specified leakage current flowing through the electrochromic device.

9. The method of claim 1, wherein the desired electrical property of the electrochromic device comprises a value of at least one of a desired voltage across the electrochromic device or a desired leakage current flowing through the electrochromic device with respect to a specified level of transparency for the electrochromic device.

10. An electrochromic device design system, comprising:
a storage unit configured to store one or more models representing relationships of at least one of a desired optical property of an electrochromic device, or a desired electrical property of the electrochromic device with respect to one or more parameters of the electrochromic device, wherein the desired optical property includes at least one of a level of transparency in a clear state, a level of transparency in a dark state, a contrast, a coloration efficiency, a color in the clear state, or a color in the dark state, and wherein the desired electrical property includes at least one of a control voltage, a current, or a leakage current; and
a processing unit configured to:
    receive, via an interface, an input indicative of at least one of the desired optical property or the desired electrical property of the electrochromic device;
    obtain, from the storage unit, at least one model of the one or more models representing the relationships of the desired optical property or the desired electrical property with respect to the one or more parameters of the electrochromic device;
    determine, using the obtained at least one model and according to the received input, at least one value of at least one parameter of the one or more parameters for the electrochromic device to specify a new a deposition temperature parameter, a new thickness of a counter-electrode (CE) layer parameter, a new thickness of an electrochromic electrode (EC) layer parameter, a new ratio of the thickness between the CE layer and the EC layer parameter, or new an amount of lithium doping parameter for use in forming the electrochromic device to achieve the one or more desired properties for the electrochromic device; and provide, via the interface, an output indicative of the at least one determined value of the at least one parameter of the one or more parameters for the electrochromic device to reach at least one of the desired optical property for the electrochromic device or the desired electrical property for the electrochromic device.

11. The system of claim 10, wherein the at least one value of the at least one parameter of the one or more parameters for the electrochromic device comprises the thickness of the CE layer for the electrochromic device.

12. The system of claim 10, wherein the at least one value of the at least one parameter of the one or more parameters for the electrochromic device comprises the thickness of the EC layer for the electrochromic device.

13. The system of claim 10, wherein the at least value of the at least one parameter of the one or more parameters for the electrochromic device comprises the amount of lithium doping for the electrochromic device.

14. The system of claim 10, wherein the at least value of the at least one parameter of the one or more parameters for the electrochromic device comprises the ratio between the thickness of the EC layer and the thickness of the CE layer with respect to the amount of lithium doping for the electrochromic device.

15. The system of claim 10, wherein the at least one value of the at least one parameter of the one or more parameters for the electrochromic device comprises the deposition temperature to change phase morphology for the electrochromic device.

16. The system of claim 15, wherein changing the phase morphology for the electrochromic device comprises adjusting a fraction of crystalline phase of tungsten oxide (WOx) within the electrochromic device.

17. The system of claim 10, wherein the desired optical property of the electrochromic device comprises a desired level of transparency of the electrochromic device with respect to at least one of a specified voltage applied across the electrochromic device or a specified leakage current flowing through the electrochromic device.

18. The system of claim 10, wherein the desired electrical property of the electrochromic device comprises a desired voltage across the electrochromic device or a desired leakage current flowing through the electrochromic device with respect to a specified level of transparency for the electrochromic device.

19. A system, comprising:

at least one processor; and memory storing program instructions that are executable by the at least one processor, wherein, in response to receiving, via an interface, an input indicative of a desired value for at least one of a desired optical property of an electrochromic device and including at least one of a level of transparency in a clear state, a level of transparency in a dark state, a contrast, a coloration efficiency, a color in the clear state, or a color in the dark state, or a desired electrical property of the electrochromic device and including at least one of a control voltage, a current, or a leakage current, the program instructions are configured to cause the at least one processor to:

obtain one or more models representing relationships between property values of the electrochromic device and one or more parameters of the electrochromic device, wherein the one or more parameters including at least one of a deposition temperature, a thickness of a counter-electrode (CE) layer, a thickness of an electrochromic electrode (EC) layer, a ratio of the thickness between the CE layer and the EC layer, or an amount of lithium doping within the electrochromic device;

determine, using the obtained one or more models and according to the desired value of the received input, at least one value of at least one parameter of the one or more parameters of the electrochromic device to specify a new deposition temperature parameter, a new thickness of a counter-electrode (CE) layer parameter, a new thickness of an electrochromic electrode (EC) layer parameter, a new ratio of the thickness between the CE layer and the EC layer parameter, or new an amount of lithium doping parameter for use in forming the electrochromic device to achieve the one or more desired properties for the electrochromic device; and provide, via the interface, an output indicative of the desired value for the electrochromic device to reach at least one of the desired optical property for the electrochromic device or the desired electrical property for the electrochromic device.

* * * * *